US006792560B2

(12) United States Patent
Francis et al.

(10) Patent No.: US 6,792,560 B2
(45) Date of Patent: Sep. 14, 2004

(54) RELIABLE HARDWARE SUPPORT FOR THE USE OF FORMAL LANGUAGES IN HIGH ASSURANCE SYSTEMS

(75) Inventors: Patrick J Francis, Gloucester (GB); Richard Charles John Hicks, Gwent (GB)

(73) Assignee: Nortel Networks Limited, St. Laurent (CA)

( * ) Notice: Subject to any disclaimer, the term of this patent is extended or adjusted under 35 U.S.C. 154(b) by 511 days.

(21) Appl. No.: 09/735,035

(22) Filed: Dec. 12, 2000

(65) Prior Publication Data

US 2001/0044912 A1 Nov. 22, 2001

(30) Foreign Application Priority Data

May 22, 2000 (GB) .............................................. 0012352

(51) Int. Cl.[7] .............................................. G06F 11/00
(52) U.S. Cl. ............................ 714/30; 714/49; 714/733
(58) Field of Search .............................. 714/25, 30, 49, 714/52, 733

(56) References Cited

U.S. PATENT DOCUMENTS

| | | | | | |
|---|---|---|---|---|---|
| 3,478,324 | A | * | 11/1969 | Couleur et al. | 714/49 |
| 4,486,854 | A | * | 12/1984 | Yuni | 711/100 |
| 5,077,739 | A | * | 12/1991 | Criswell | 714/25 |
| 5,293,613 | A | * | 3/1994 | Hayden et al. | 714/15 |
| 5,309,445 | A | * | 5/1994 | Bartels | 714/47 |
| 5,311,462 | A | * | 5/1994 | Wells | 365/49 |
| 6,226,763 | B1 | * | 5/2001 | Fu et al. | 714/53 |
| 6,393,582 | B1 | * | 5/2002 | Klecka et al. | 714/11 |
| 6,467,056 | B1 | * | 10/2002 | Satou et al. | 714/720 |
| 6,550,018 | B1 | * | 4/2003 | Abonamah et al. | 714/6 |
| 6,633,999 | B1 | * | 10/2003 | Lee | 714/30 |

OTHER PUBLICATIONS

J.M. Wing; "A Specifier's Introduction to Formal Methods"; Sep. 1990; IEEE Computer; vol. 23, issue 9; pp. 8–24.*
Hennessy et al.; Computer Organization and Design; Published 1998; Second Edition; pp. 338–343.*
Static/dynamic Fault Relocation for a Fault Tolerant Memory; Published Apr. 1, 1982; IBM Technical Disclosure Bulletin, vol. 24, Issue 11B; pp. 6046–6047.*
System for Efficiently Using Spare Memory Components for Defect Corrections Employing Content–Addressable Memory; Published Nov. 1, 1985; IBM Technical Disclosure Bulletin, vol. 28, Issue 6; pp. 2562–2567.*
Communications of the ACM, vol. 28, No. 1. Jan. 1985. "The Manchester Prototype Dataflow Computer". J R Gurd, C C Kirkham and I Watson.

* cited by examiner

Primary Examiner—Scott Baderman
Assistant Examiner—Joshua Lohn
(74) Attorney, Agent, or Firm—Barnes & Thornburg

(57) ABSTRACT

A dataflow processor comprising a combiner for combining instructions and data, processing elements for carrying out the instructions, has error checking at the inputs to the processing elements and the combiner, and has self-checking circuitry for these parts. The amount of circuitry which needs to be trusted, (i.e. of proven design, and verified operation) can be advantageously limited. This enables the processor to be constructed more simply and to operate faster. The processing elements may have a series of state machines, each checking the output of the previous. Self checking circuitry may be constructed using combinations of basic configurable verified circuit. This circuit has a reversible Boolean function, and other circuitry to check its output. The other circuitry has a second reversible Boolean function for regenerating the original inputs, and a comparator for verifying if the regenerated values match the original values.

20 Claims, 16 Drawing Sheets

SERIES OF STATE MACHINES

OPERATION OF SERIES OF STATE MACHINES

Assured Checking Block Mechanism.

Schematic of the Checking Process

| INPUT | | | OUTPUT |
|---|---|---|---|
| A | B | C | (A.B) ⊕ C |
| 0 | 0 | 0 | 0 |
| 0 | 0 | 1 | 1 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 0 |

TRUTH TABLE FOR REVERSIBLE GATE

RELIABLE HARDWARE SUPPORT FOR THE USE OF FORMAL LANGUAGES IN HIGH ASSURANCE SYSTEMS

BACKGROUND TO THE INVENTION

There are many applications for software based digital processing systems that need to be particularly reliable. The need for high reliability may be for the provision of safety, as in the case of software controlling the flight surfaces of an otherwise inherently unstable aircraft, or for the control of a potentially hazardous industrial process. High reliability is also required in systems handling financial transactions. The reliability issue can be divided into software reliability and hardware reliability.

Regarding software reliability, there is a difficulty in proving correct operation since "conventional" programming languages are based upon the destructive assignment statement at the very heart of the von Neumann paradigm of computation. The level of indirection introduced as a consequence of "location addressing", i.e. that the contents of a given storage location has no relation with its address, results in non-tractable problems which, arguably, become manifest throughout an entire computer system. This essentially means that entities such as formal system proofs and meaningful system metrics cannot be attained whilst using this class of language. Also, conventional processors tend to have instruction sets which are completely defined. As a consequence, if there is an error in code being executed, the resulting output may be unpredictable, even if the error is well defined.

At the same time, it is well known that purely declarative programs are very amenable to formal proof of conformance to a given system specification, and that with the assistance of various formal toolsets, can also highlight any inconsistencies or ambiguities contained within that system specification.

The inventors have recognised that if the software component of a system is provably correct at the outset, it will remain correct in the future. On the other hand, even if the hardware component of the system is provably correct at the outset, it will eventually fail. This leads to the aim of producing a hardware design which is provably correct at the outset, and that the integrity of its operational correctness will be checked repeatedly throughout its life.

The VIPER 1 and VIPER 2 projects were a very serious attempt to realise a formally verified processor, made some years ago, and were used in a railway signalling application. Besides being criticised as being too slow and restrictive, they did not gain widespread adoption. VIPER 1 and VIPER 2 were processors based upon the "conventional" location addressing paradigm. In effect, the degree of proof which they could attain was the consequence of an engineering trade-off where a severely restricted set of machine code instructions impeded the usefulness of the reduced instruction set computer.

Specialised processors more suited to some declarative languages have been developed. For example, dataflow architectures have been developed over several decades. One is shown in an article in Communications of the ACM, January 1985, vol 28 no. 1, "The Manchester Prototype Dataflow computer" by Gurd et al. This involves a pipelined ring structure including a token queue, for storing data and instructions to be processed, a combiner (also called a matching unit), for combining instructions and associated data, an instruction store containing machine code for each instruction, and a number of execution units coupled in parallel for carrying out particular functions. The ring also contains a switch for switching the output of the execution units either to a system output, or back to the start of the ring, the token queue, for further processing.

The reliability and provability of correct operation of this type of hardware architecture, or of its component parts still presents problems. Conventional ways of improving hardware reliability include specifying high reliability components for mission critical parts, carrying out burn in of parts, and providing redundancy at component and/or system level. A drawback with redundancy is the additional cost, and the risk of the failure in the hardware for detecting failure and selecting which of the redundant systems or components to choose in the event of a fault. Such additional complexity makes the task of verifying correct operation, or of being certain of detecting faulty operation, much more difficult. Another conventional way of handling both hardware and software faults such as radiation induced errors in stored values, is to include a checking mechanism where, for example, a parity check is the simplest method of detecting the occurrence of a single error. This is used in some random access memories (RAM), which store a parity check bit for each byte of data, then verify the parity bit is correct for that byte when the byte is read out.

SUMMARY OF THE INVENTION

It is an object of the invention to provide improved arrangements which address the above mentioned problems.

According to the invention there is provided a processor for executing instructions, comprising a data store, an instruction store, a combiner for combining instructions and data associated with a respective one of the instructions, processing elements for carrying out the instructions and outputting results, wherein the processing elements and the combiner comprise trusted circuitry, the trusted circuitry comprising circuitry whose design has been proven to operate correctly, and comprising self checking circuitry for checking that it has not operated incorrectly, the processor further comprising circuitry for checking for errors in data and instructions input to the processing elements and to the combiner.

An advantage of the combination of error checking at the inputs to the processing elements and the combiner, and having self-checking circuitry for these parts, is that the amount of circuitry which needs to be trusted, (i.e. of proven design, and verified operation) can be advantageously limited. This enables other parts of the processor to use circuitry which is not necessarily rigorously verified, and therefore can be constructed more simply and to operate faster.

An advantage of checking the combined data and instruction, rather than e.g. conventional parity checking of individual bytes read out of RAM, is that a wider range of errors, such as addressing errors, and multi-bit errors, can be detected before execution.

Furthermore, an advantage of having error checking at the input to the processing elements is that it enables different types of data to be segregated. Different parts of the circuitry can be allocated to handle different types of data, and finer granularity of checking and error confinement can be used to check that the right type or form of data is being input. This can provide a greater guarantee of correct segregation of data, and thus further guarantee integrity of the system. It is a simpler and more direct method than existing software based segregation of different types of data.

Preferably the processor comprises circuitry for detecting an error in data output by the processor.

An advantage of this is that it enables untrusted (or possibly flawed) circuitry such as data storage elements, to be used before the data is output, yet still maintain reassurance that correct data is being output.

Preferably circuitry for checking the data comprises circuitry for adding error detection information to the data before the data is passed to untrusted circuitry, and circuitry for using the error detecting information to detect errors in the data after it has passed through the untrusted circuitry. This is an efficient way of verifying that the data has not been corrupted by the untrusted parts of the circuitry, with little reduction in bandwidth or additional cost in processing time or hardware.

Preferably the circuitry for detecting an error and adding the error detection information comprises trusted circuitry. An advantage of this is that otherwise any errors in the detecting or adding of this information might not be captured, and the error detection cannot be trusted completely. This helps ensure that every possible error will be captured and contained.

Preferably the processor is arranged to handle data of different types, and comprises circuitry for detecting which type a given piece of data is and checking that the type is a valid type for whatever operation is to be carried out on the data.

This is a preferred way of enabling segregation of different types of data, such as highly critical data, or partially processed data, to ensure such types are processed or output at the correct time, and by the correct piece of hardware or output to the correct destination for example.

Preferably the type of data is indicated in a label attached to the given piece of data.

Again, this is an efficient way of enabling the different types of data to be certainly and assuredly segregated and processed accordingly.

Preferably the error detection information relates to a bound data packet comprising the label and the associated data.

An advantage of the error detection being at this level is that it can catch incorrect labels or data, and also catch an incorrect association of otherwise correct label and data.

Preferably the self-checking circuitry comprises a series of state machines, comprising least a first and a second state machine, the first state machine being arranged to receive one or more data inputs to be checked, and provided with data outputs for reflecting the one or more data inputs, and an alarm output for indicating that the data inputs are incorrect, the second state machine being coupled to the data outputs and the alarm output of the first state machine, and being arranged to verify that the data output and the alarm output of the first state machine are correct An advantage of such cascaded state machines for checking is that because the outputs mirror the inputs, it is possible to use identical or near identical state machines throughout the series. The more finite state machines there are in the series, the higher is the assurance that any error in the inputs or in the self-checking circuitry will be detected. Thus once the circuit design is proved for one state machine, others can be added easily to give any desired degree of assurance, without increasing the burden of proving the design. In particular this gives reliable detection of multiple errors in the state machines. In contrast, in a parallel redundant scheme, it is possible for some multiple errors to go undetected.

Preferably the first state machine comprises a processing function and is arranged to output one or more processed data outputs, and all the subsequent state machines in the series are arranged to receive the processed data outputs from a respective preceding one of the state machines, check if any are incorrect and output them to a respective succeeding one of the state machines.

An advantage of integrating the processing function is that greater assurance of correct operation can be obtained than if the processing function is separate, and only its outputs are checked.

Preferably a data output of the last in the series of state machines is fed back into any of the state machines. An advantage arising from the feedback is that the verification can now include not only the operation of intermediate state machines, but the operation of the final state machine which drives the output data signal or signals. This is useful to cover this gap in the trusted circuitry. It may be warranted if for example the data output triggers expensive remedial action, rather than merely flagging a warning light for example.

Preferably the circuitry for checking the operation of the processing elements further comprises two or more state machines coupled in series, and circuitry for carrying out a sequence which causes toggling of each output of each state machine to verify the operation of each output of the state machines.

This enables both the logical operation of the state machines, and circuitry between the state machines for example, to be verified.

According to another aspect of the invention, there is provided a circuit arrangement comprising a series of state machines, comprising least a first and a second state machine, the first state machine being arranged to have a data output, and an alarm output for indicating incorrect internal operation, the second state machine being coupled to the data output and the alarm output of the first state machine, and being arranged to verify that the data output and the alarm output of the first state machine are correct, a last state machine in the series being arranged to output an indication of correct operation, and a data output, the data output being fed back as an input into one of the series of state machines.

An advantage of such state machines is that their internal operation can be dynamically verified during operation. An additional advantage arising from the feedback is that the verification can now include not only the logical operation, but also the correctness of operation of the circuitry which drives the output data signal or signals.

According to another aspect of the invention, there is provided an arrangement of two or more redundant processing systems, each outputting processed data, and a selector for selecting one of the processed data outputs, the arrangement further comprising circuitry for checking the correct operation of the respective processing system, the circuitry for checking the processed outputs, and the circuitry for selecting between the processed outputs comprising trusted circuitry, the trusted circuitry comprising circuitry whose design has been proved to be correct, and comprising self-checking circuitry for checking if it has operated incorrectly.

An advantage of this arrangement is that it is no longer necessary to provide an odd number of redundant systems as is employed in conventional "voting" techniques. Instead, the trusted circuitry is sufficient to know which of an even number of systems is working incorrectly. Thus fewer redundant systems will be needed to assure a given level of reliability.

Preferably the circuitry for checking the correct operation comprises the above circuit arrangement having a series of state machines.

A further aim is to identify and provide a single basic building block from which we can construct the hardware platform upon which to support that formal language. This is achieved by identifying and building a basic universal computing functional component that is expressly amenable to be designed to possess assuredly correct operation. Because such a design is difficult and expensive to achieve, the approach set out below adopts the notion of having a single design of hardware building block. However, the building block is capable of being reconfigured so as to provide a set of assured computational functions, together with a set of functions that assist in the self-checking of each functional device.

This approach uses a Boolean function which can be described as being "reversible". This means that the Boolean function is its own inverse. Many such reversible Boolean functions exist. One has been chosen to exemplify how a reversible function assists in the checking of operational correctness. Thus, we show how a set of assured universal computational functions is obtained.

By appropriately combining a number of simple reversible functions in order to obtain a function of higher order, that higher order function can itself be trusted. The checking described can be used recursively and nested at various levels in the design. The approach described is independent of an implementation technology. It will apply to any digital processing system. The bistate devices could be implemented in, for example, an optical or electronic technology where switching is performed by bistate elementary devices.

According to this aspect of the invention, there is provided circuitry which forms a reversible gate, the circuitry comprising three or more inputs, denoted A, B, C, and the same number of outputs, a first of the outputs taking the same value as input A, a second of the outputs taking the value of input B, and a third of the outputs being arranged to have a logic value which is a reversible Boolean function of the three inputs An advantage of such an elementary gate is that it enables assured checking of a given logic function since it is reversible. Simply by taking the three specified outputs and applying them to inputs A, B, C of a second identical circuit, the outputs of the second circuit should regenerate the original inputs to the first circuit, A, B & C. The basic circuit can be used in serial combinations to perform a given computational function, and that overall function will also posses reversibility. The reversibility lends itself to the provision of assured checking. This checking can be achieved by comparing the outputs of the reversed function, with the original input signals. Thus by combining multiple such blocks, any complex Boolean expression can be implemented efficiently. Also, since each of the blocks are trusted, the circuitry required for checking the correctness of operation of the complex Boolean expression can be provided easily and proved with a minimum of effort. Such types of logic also lend themselves to implementation in optical circuitry or any other type of digital technology, for appropriate applications.

Preferably the reversible Boolean function comprises the function (A AND B) XOR C. This type of reversible Boolean logic is particularly useful as it can be used to form logical AND, XOR, NOT and COPY functions, simply by tying one of the three inputs as described below in the detailed description section.

According to a further aspect of the invention, there is provided an arrangement comprising a first and a second reversible logic block coupled in series, and a comparator arranged to verify the operation of the first reversible logic block by comparing an input of the first logic block with an output of the second reversible logic block, the first and second logic blocks having the same internal operation.

An advantage of such an arrangement is that since the logic block is reversible, the same block can be used for verification, as for implementing the function. Thus once the internal design of the block is proved to be correct, to implement the desired function, the circuitry for verification that the block is operating correctly, can be added with little or no extra effort required to prove that the verification circuitry has been designed correctly.

Preferably, the first reversible logic block comprises two or more of the above mentioned reversible gates coupled so as to implement a more complex boolean logic function.

Another aspect of the invention provides a processor for a processor for executing instructions, comprising a data store, and instruction store, a combiner for combining instructions and data associated with a respective one of the instructions, and processing elements for carrying out the instructions and outputting results, the data store having an arrangement to turn off a portion of the data store found to be faulty during operation of the data store. This enables reliability to be improved easily and cost effectively. A convenient way of achieving this is to use a content addressable memory. Another aspect of the invention provides a processor for a processor for executing instructions, comprising a data store, an instruction store, a combiner for combining instructions and data associated with a respective one of the instructions, processing elements for carrying out the instructions and outputting results, one or more external interfaces and a selector for selectively coupling the external interfaces to the processing elements. This brings two advantages, firstly redundancy can be provided, to avoid a failed processor element blocking an interface. Secondly, it can enable a single interface to be coupled to multiple processors in parallel for faster operation, or multiple interfaces to be coupled in parallel, as appropriate.

A further aspect of the invention provides a memory arrangement having storage elements, addressable by a content addressing arrangement, and an arrangement for turning off storage elements found to be faulty during operation, while maintaining availability of the remaining storage elements.

A further aspect of the invention provides a processor for executing instructions, comprising a data store, an instruction store, a combiner for combining instructions, and data associated with a respective one of the instructions, processing elements for carrying out the instructions and outputting results, the processor having a fault detector for indicating whether an instruction has been carried out successfully, the processor being arranged to store an instruction until it has been carried out successfully, and to repeat an instruction in response to an indication that the instruction has not been carried out successfully. Such recovery from faults again enables the reliability to be improved in a cost effective manner.

Further embodiments of the invention provide methods of operation of the above hardware, methods of using the above hardware to produce output signals, and systems for running software written in a declarative language on the above hardware.

The preferred features may be combined in any manner, or combined with any of the aspects of the invention, as would be apparent to a person skilled in the art. Other advantages than those mentioned above will be apparent to a person skilled in the art, particularly in relation to prior art other than that discussed above.

DETAILED DESCRIPTION

Figure 1:
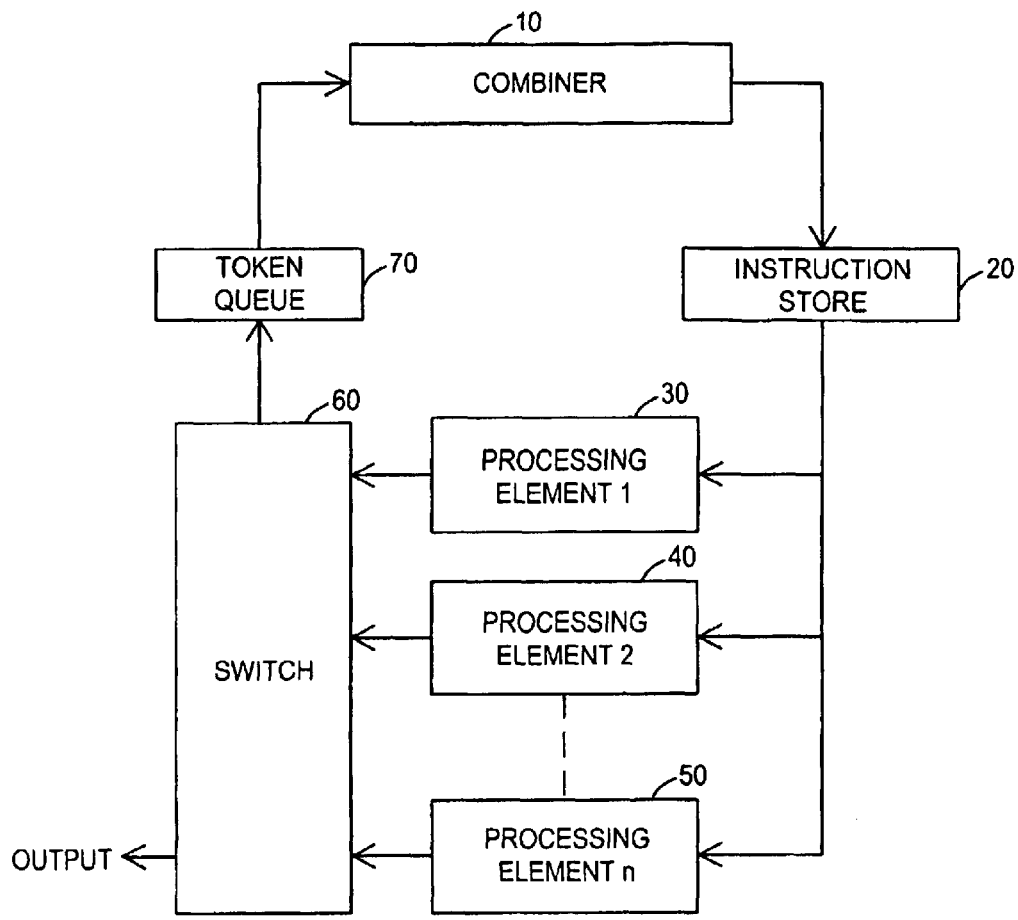
FIG. 1 shows a prior art dataflow processor in schematic form.
Figure 2:
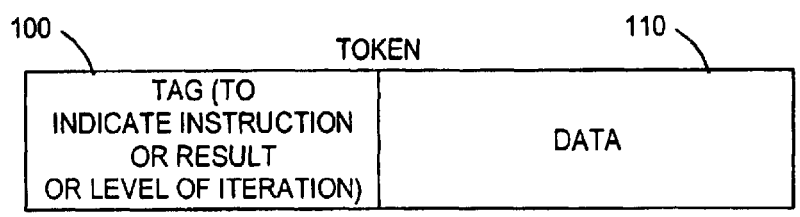
FIG. 2 shows a prior art token as used in the processor of FIG. 1.

FIGS. 1 and 2; Prior Art Dataflow Processor

FIG. 1 shows a known dataflow processor in schematic form according to the above mentioned Manchester prototype dataflow computer. Processing takes place in a pipeline ring structure with data and instructions flowing clockwise as shown and being output from the ring at the bottom left. The ring includes a combiner 10, an instruction store 20, processing elements 1:n, 30, 40, 50 arranged in parallel. A switch, 60 switches the outputs of the execution of the processing elements to the output of back around the ring for further processing. A token queue 70 provides buffering to smooth the flow around the ring. The combiner 10 combines instructions with data associated with the instruction.

FIG. 2 shows the structure of tokens, which comprise a tag 100 and a data portion 110. The tag indicates an instruction to be carried out on the data, or after passing through the processing element that the data is a result or an intermediate result.

This type of structure is intrinsically more amenable for formal verification than the traditional Von Neumann architecture.

Figure 3:
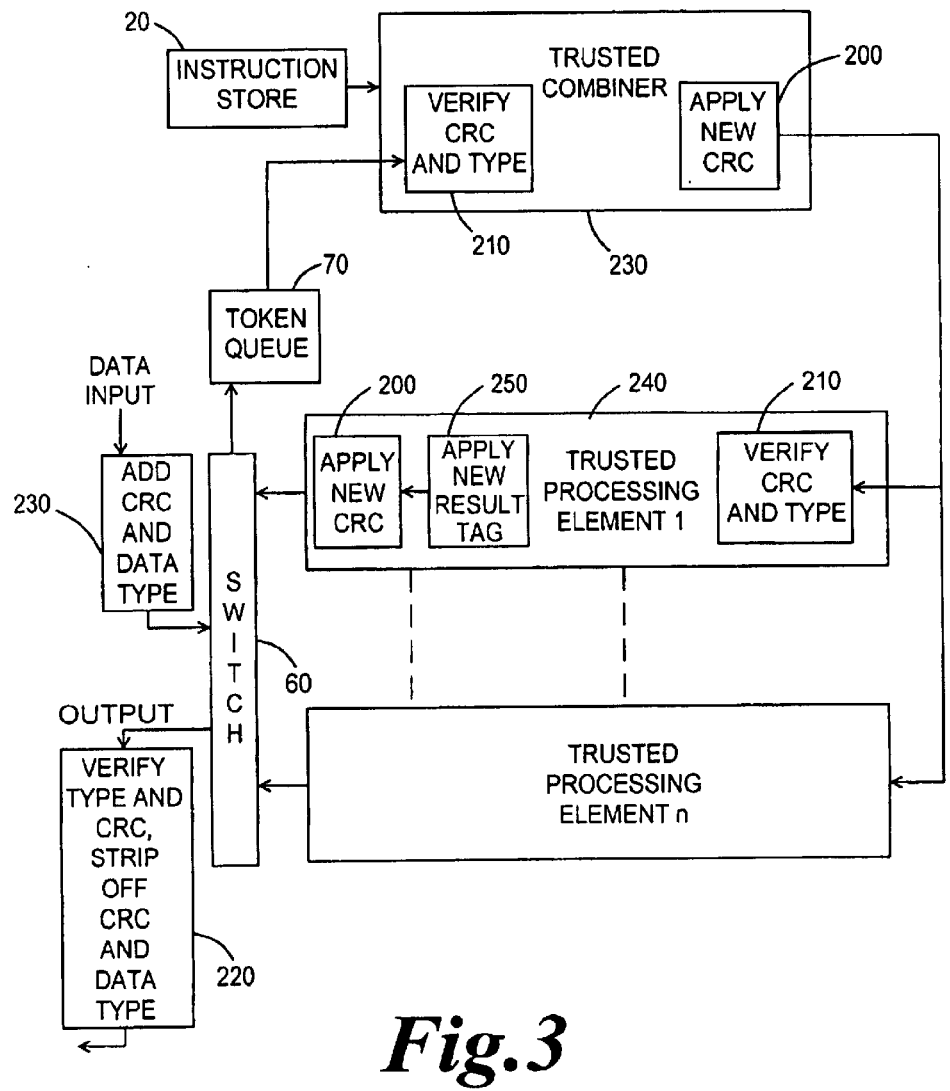
FIG. 3 shows a data flow processor according to a first embodiment of the invention.

FIG. 3; Data Flow Processor According to a First Embodiment

FIG. 3 shows a number of modifications to the architecture of FIG. 1. Firstly, the instruction store has been moved to precede the combiner. Secondly, checking circuitry in the form of circuitry for applying a CRC (cyclical redundancy code) is provided at various places around the ring. In particular, the CRC of each token is checked by verification circuitry 210 at the input to the combiner and the input to the processing elements. It may also be optionally checked elsewhere such as at the output, 220 and a CRC may optionally be added at the data input 230. The purpose is to enable some of the processor to be constructed of trusted circuitry, without requiring that all of it be of trusted circuitry. In this case, the combiner 230 and the processing elements 240 are formed of trusted circuitry (examples of implementations of such trusted circuitry will be described below in more detail).

As shown in FIG. 3, at the output of each processing element, there is circuitry 250 for applying a new tag, and circuitry 200 for calculating and applying a new CRC to the token. This is necessary because the contents of the token will have been changed by the processing element. The token can then be passed to untrusted circuitry such as the switch and the token queue.

The queue and switch may be difficult or expensive to implement in trusted circuitry. The use of the CRC means there is little chance of errors in operation in untrusted circuitry going undetected. Other ways of checking of errors could be implemented, including error correction codes, or centrally stored detection codes, though CRC codes attached to the tokens are preferred for the sake of efficiency.

Additionally, it is preferred to apply the CRC to the entire token including data and instruction, rather than carrying out error detection at the byte level. Byte level error detection has been carried out previously in known memory chips, in the form of a parity check. Such low level checking would not be able to detect errors such as an incorrect combination of individually correct data and instruction portion.

A further distinction over the known arrangement of FIG. 1 is that the type of data is indicated in the token, and is checked by the verification circuitry 210 at the input to the combiner, and at the input into the processing elements. This enables hardware level segregation of different types of data to be assured. For example, safety critical data can be handled separately from other data. Also, this enables the data type to be checked at the output. Thus different outputs can be assigned to different types of data. This can give hardware level assurance that the wrong type of data will not be mistakenly output on a safety critical output for example. Also, it can ensure that partially processed data (intermediate results) cannot be output if this is undesirable or unsafe for the particular application.

Figure 4:
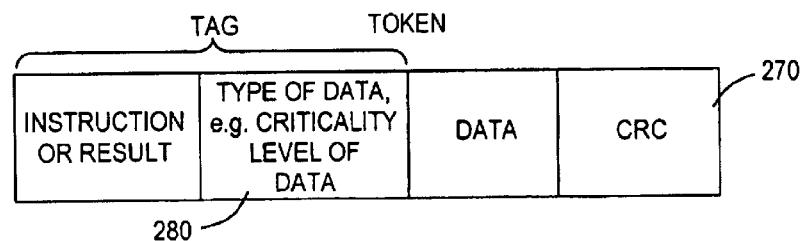
FIG. 4 shows a token for use in the embodiment of FIG. 3.

FIG. 4; Token for Use in the Embodiment of FIG. 3

FIG. 4 shows the structure of a token for use in the arrangement of FIG. 3. When compared with the token shown in FIG. 2, it is evident that a CRC field 270, and the tag now includes an indication of the type of data such as criticality level, 280, or priority level for example.

Figure 5A:
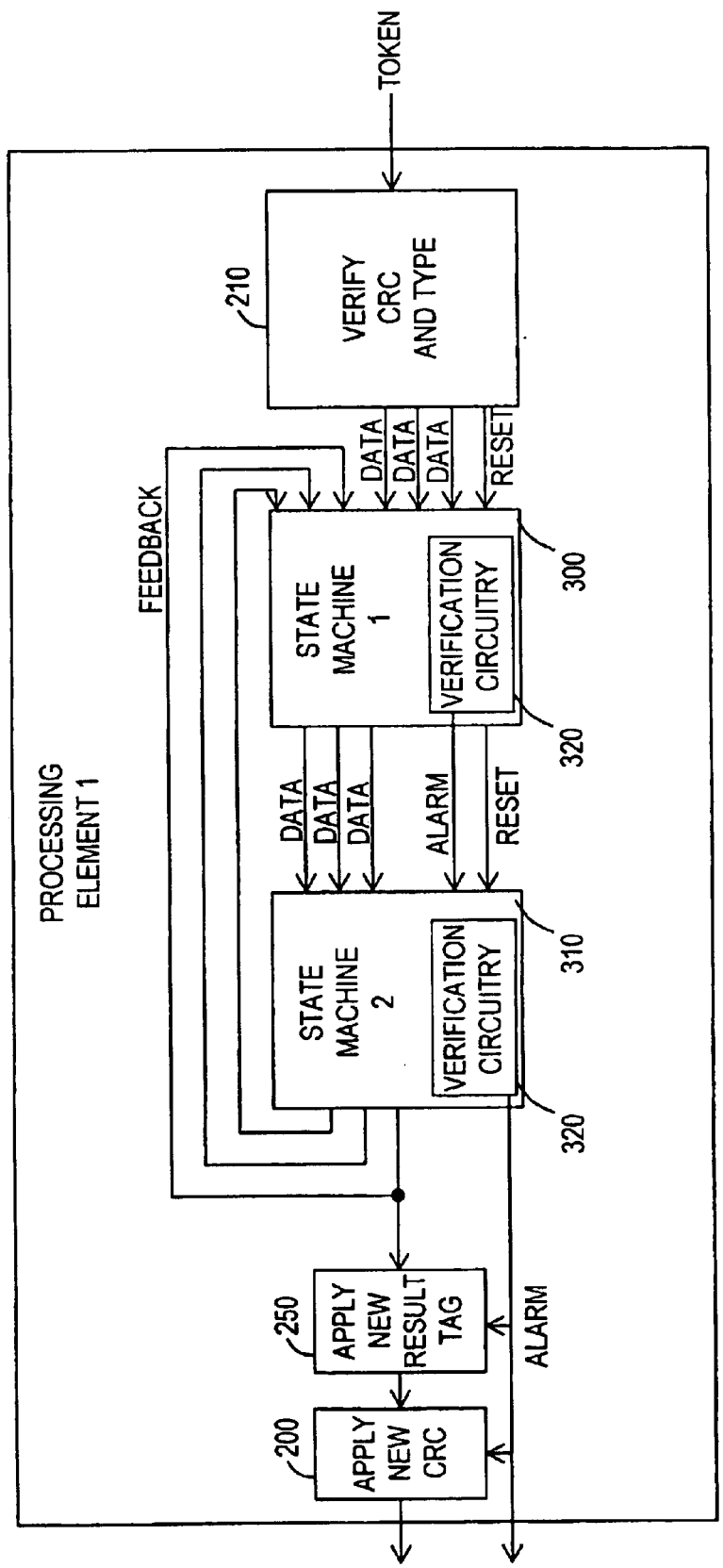
FIG. 5A shows an example of an implementation of one of the processing elements of FIG. 3, using a series of state machines.

FIG. 5A; Processing Element for Use in the Arrangement of FIG. 3, Using a Series of State Machines FIG. 5A shows circuitry 210 for verifying the CRC and the type, of a token input from the ring shown in FIG. 3.

The trusted circuitry comprises a pair of state machines coupled in series. A state machine is any logic function which changes state upon a timing signal, and whose outputs are dependent on its inputs and its previous state. A first state machine 300 takes in data from the token (without needing to take in the CRC and the type). The desired processing function is carried out within the first state machine. Outputs from the first state machine are passed to the second state machine 310 for checking. If the second state machine verifies the outputs of the first state machine are correct, the output of the second state machine is passed to circuitry 250 for applying a new result tag, and circuitry 200 for applying a new CRC.

The first and second state machines form an example of trusted circuitry which can be formally verified, and which contains circuitry for checking that it has operated correctly. The state machine could be embodied by straight combinatorial logic, in which case the outputs depend only on the current inputs, not on previous states. However, more useful functions can be implemented if the state machine includes feedback or internal registers to make the outputs dependent additionally on previous states.

In order to check the operation of the first state machine, the second state machine may need to be fed with the same inputs as the first state machine, as well as being fed with the output of the first state machine. This can be achieved either by passing the input data directly through the first state machine, as shown in FIG. 5, or by duplicating the input signals and passing one copy to the second state machine without passing through the first state machine.

Each state machine includes verification circuitry 320 for checking the inputs to the respective state machine, or whether the internal operation on the inputs is correct, or both. If an invalid combination of inputs, or an invalid sequence of inputs is detected, or if incorrect internal operation is detected, an alarm is raised and passed onto the next state machine.

The first state machine thus outputs processed data, an alarm, and a copy of its input data. The second state machine takes in all these outputs of the first state machine, and effectively checks that they are all correct. It includes almost identical circuitry to that in the first state machine. The same function is carried out on the raw data inputs, to give serial redundancy, to enable the processed data output of the second state machine to be compared with the processed data output of the first state machine.

The verification circuitry 320 for the second state machine duplicates that of the first state machine, since the same inputs are present on the second state machine.

Optionally, there is a reset line extends into each of the state machines for the purpose of triggering a test of each of the logic lines external to the state machines, such as the lines linking the two state machines. These can be tested by toggling to ensure that none of the lines are shorted together, or stuck in a logic 1 or logic 0 position. Such a test could be triggered periodically, or by an external reset signal for example on power up, as desired. For maximum reassurance, it could be triggered every time the processing element is used for particularly critical operations, though at the cost of slowing down the operation.

Also shown in FIG. 5A is an optional feedback path of the outputs of state machine 2 back into the input side of state machine 1. This can enable a further check against a situation in which the second state machine operates correctly internally, yet one or more of its outputs is short circuited e.g. to another line, or to a logic 1 or logic 0. The verification circuitry 320 could detect an invalid combination or sequence in this case.

While it would be possible to design the processing element using parallel redundancy, and a comparator to compare the outputs, the series cascade of state machines brings some advantages. Notably, the first and second state machines can be virtually identical, and therefore a single implementation in hardware can be taken through the possibly lengthy process of formal proof of operation, then the cascade of state machines can be built up using duplicate or near identical implementations. This enables the cascade of state machines to be built up with little or no additional effort involved in establishing proof of correct operation. Furthermore, any number of these state machines can be coupled in series, depending on the level of assurance required. The first and last in the series of state machines may be slightly different in having particular output characteristics, though any intermediate state machines would be identical. The circuitry for verifying the CRC and data type, and the circuitry for applying a new type and new CRC may be trusted circuitry themselves, each implemented by a cascade of state machines.

Although the figure shows separate circuits for the functions of verifying CRC, the processing algorithm and applying the new CRC, in principle these three functions could be implemented by a single cascade of state machines. An advantage of the separated embodiment as shown is that the state machines can be simpler, and so easier to prove. Also, common elements such as the verifying of the CRC can be re-used.

Figure 5B:
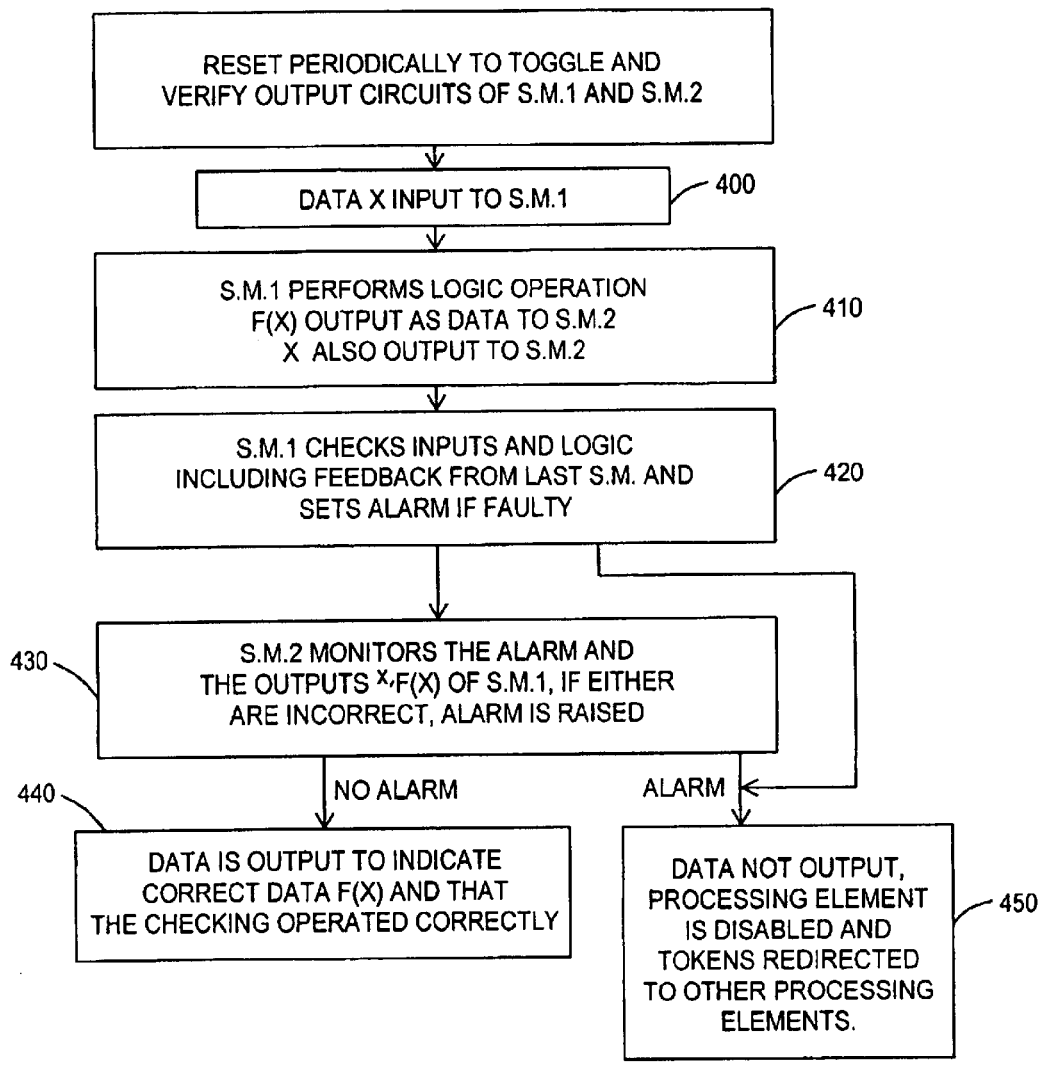
FIG. 5B shows in schematic form the operation of the series of state machines shown in FIG. 5A.

FIG. 5B; Operation of the Series of State Machines Shown in FIG. 5A

FIG. 5B shows a schematic view of the operation of the state machines. There may be an optional preliminary step of verifying connecting circuits by going through a reset sequence which causes all the outputs to be toggled. Then at step 400, data X is input to state machine 1. State machine 1 (SM1) performs its logic operation F(X) and outputs the processed data, F(X) to the input of the second state machine, at step 410. At step 411, the verification circuitry checks all the inputs to the first state machine and sets an alarm if a fault is detected, step 420.

At step 430, the second state machine monitors the alarm input from the first state machine, and checks all the outputs of the first state machine. If either the alarm is set, or an error is detected in the output X, F(X) of the first state machine, the second state machine raises an alarm signal.

As shown at step 440 if there is no alarm raised by either state machine, then data F(X) is output by the second state machine to the next stage, which indicates that the function and the checking circuitry all operated correctly.

At step 450, if an alarm is raised by either of the state machines, data is not output and the processing element may be disabled, and tokens redirected to other parallel processing elements. In some applications, it may be more appropriate to allow the output to continue, together with a flag that it cannot be relied on. For example, in flight control software, it may be preferable to allow processing to continue rather than stop processing, when such a fault is detected.

An alternative to the operation shown in FIG. 6 would be to have the function F(X) carried out in untrusted circuitry, and simply feed the result into the series of state machines shown in FIG. 5A. The series of state machines would then simply be used for checking the sequence or a combination of outputs F(X). This might be feasible if the function is simple enough to be fully monitored in this way.

Figure 6A:
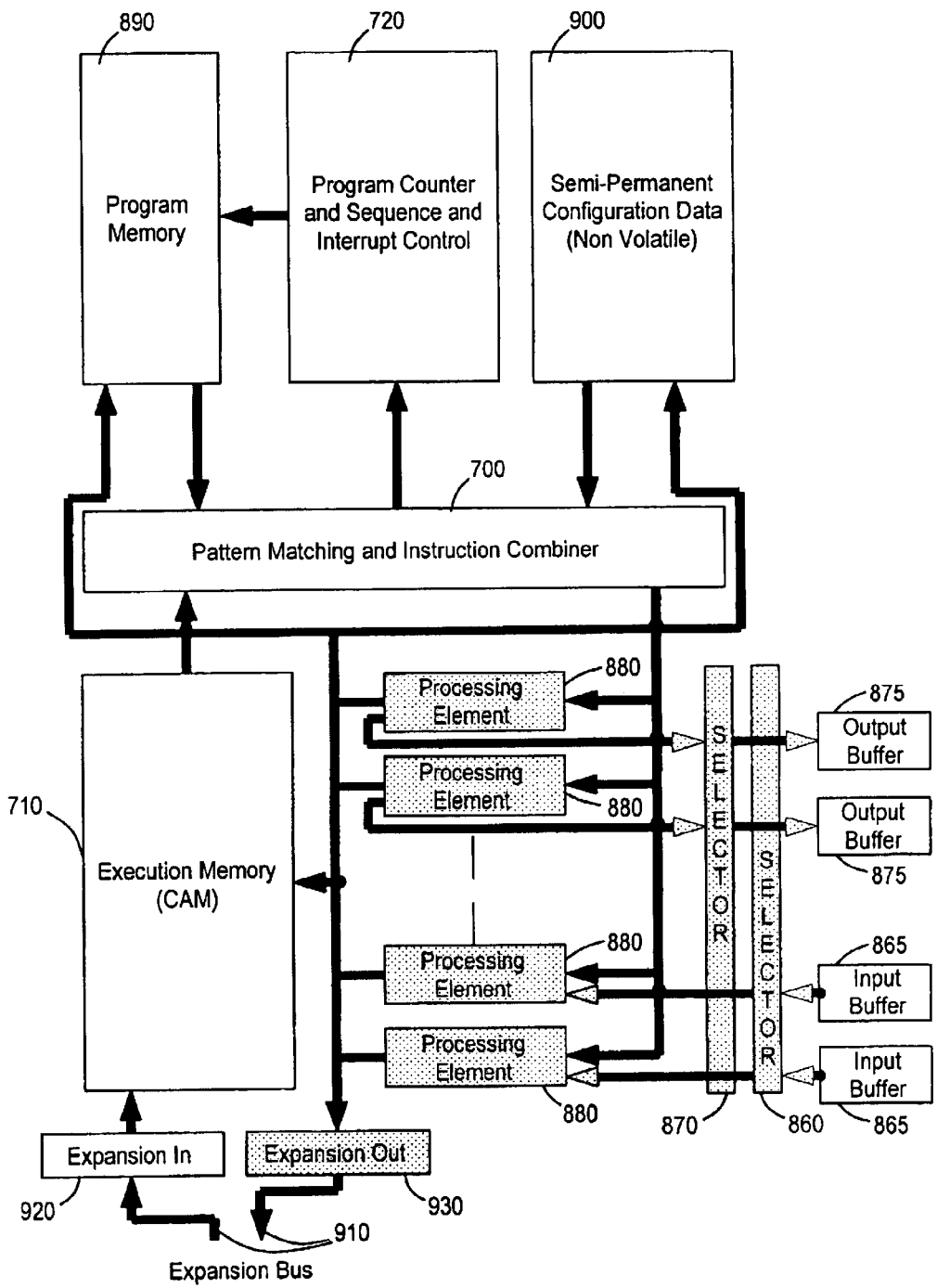
FIGS. 6A to 6H show a data flow processor and other features according to other embodiments of the invention.

FIG. 6A Data Flow Processor

The top-level architecture of another embodiment is outlined in FIG. 6A. As in FIG. 3, the architecture reflects some of the concepts used in the Manchester Data Flow Machine (MDFM), developed mainly during the 1980's.

The architecture described here incorporates a number of enhancements to the basic MDFM. In this architecture, program instructions from the program memory and data from the execution memory are combined into composite instructions by the Pattern Matching and Instruction Combiner (PMIC). These composite instructions are then passed to one of the processing elements for execution. Following successful execution, the result is written back into the execution memory where it is available for subsequent processing. There are several processing elements shown in FIG. 6A, thereby allowing multiple instructions to be processed concurrently. This allows both (a) the potential for increased speed of execution;

(b) the relatively easy inclusion of functional hardware redundancy, which can be used to provide fault tolerance in the presence of both soft and hard fault conditions.

An important concept in this data flow architecture is that none of the data held in the execution memory is overwritten. That is to say that, the destructive assignment, common to conventional processor architectures, is expressly prohibited.

Importantly, note that in conventional processor architectures, during the history of the computational process, the contents of the location would be destructively overwritten. While location addressing conserves memory (in the sense that a memory location is re-used) it also results in an intractable situation because there is no relationship between a location and its content. The contents of any store location is determined only by the history of the computation thus far. The level of indirection introduced by location addressing schemes means that proof of the correctness of the values of the variables contained within locations is not possible. In order to maintain tractability, defined as the property of software to produce the same unambiguous result provably, regardless of the type of compiler location addressing, location addressing is prohibited.

The architecture of FIG. 6A possesses two fundamental differences to conventional architectures:

(a) Firstly, the execution memory is content addressable and therefore data held in the execution memory is not location addressed, but identified by a data tag applied to the data.

(b) Secondly, data is not overwritten, so that in the example above, each value of I and A would be separate data elements. ($I_1$ through $I_N$ and $A_1$ through $A_N$ for example.) The execution memory can therefore be viewed as the "state-time space" of the program.

In the approach proposed, where the use of a destructive assignment statement is strictly prohibited, a number of advantages accrue in ensuring the correctness of functional operation, while also allowing the incorporation of hardware fault tolerance.

Because each value is represented separately, the final result, $A_N$, only appears on completion of the loop. It is not therefore possible for the loop to be only partially complete such that an invalid value of $A_N$ could be erroneously used in subsequent calculations.

The use of execution memory 710 in the form of Content Addressable Memory (CAM). goes to support the notion of "data existence". In this execution memory, data is "addressed" by its data tag (it is only this portion of the data element that is required to be content addressable). If data has not been written, it cannot be retrieved, i.e. CAM can be "empty" and will return an "empty signal" if an attempt is made to retrieve data that has not been written. On the other hand, because conventional memory is location addressed, each location will consequently always return a value. Conventional location addressed memory can never be "empty".

Further, because the physical location of data within CAM is unimportant, then should an element of the CAM become faulty, it can be "turned off" so that it is not used in any future operation. Processing can however continue as normal. In addition, because all interim values are retained, then should a memory element fail such that a piece of data becomes lost, the information necessary to re-run the instruction is still available, and the lost data can be reconstructed.

The single disadvantage from prohibiting the use of destructive assignments is that, if data is never destroyed, then an infinite amount of Execution Memory is required. To compound this, because the data tags must be unique in order to allow unique data identification, they would also need to be infinite in size. To counteract this problem, programs must be executed in "sub-routines" which each perform one specific function. When each sub-routine has completed and a result has been stored, the memory used by that sub-routine must be cleared for re-use. This requires not only that the hardware mechanisms clear the memory, but also that checks are made upon the software to ensure separation of "local" and "global" variable. This goes to ensure that two routines that may run concurrently do not use the same data tags to identify data. This is not however likely to be a problem when executing repetitive programs such as, control system loops, where the same code is run over and over again. In such cases, no data tags need to be shared, and a simple check of data tag uniqueness is possible.

The sequence control necessary to allow loops, branching etc is provided by the program Counter and Sequence and Interrupt Control element 720, which together with the program memory, forms the program sequence controller. This is a relatively conventional programmable sequence control architecture that allows branching and multiple nested loops, but also performs a self-check on start-up to ensure correct operation.

Figure 6B:
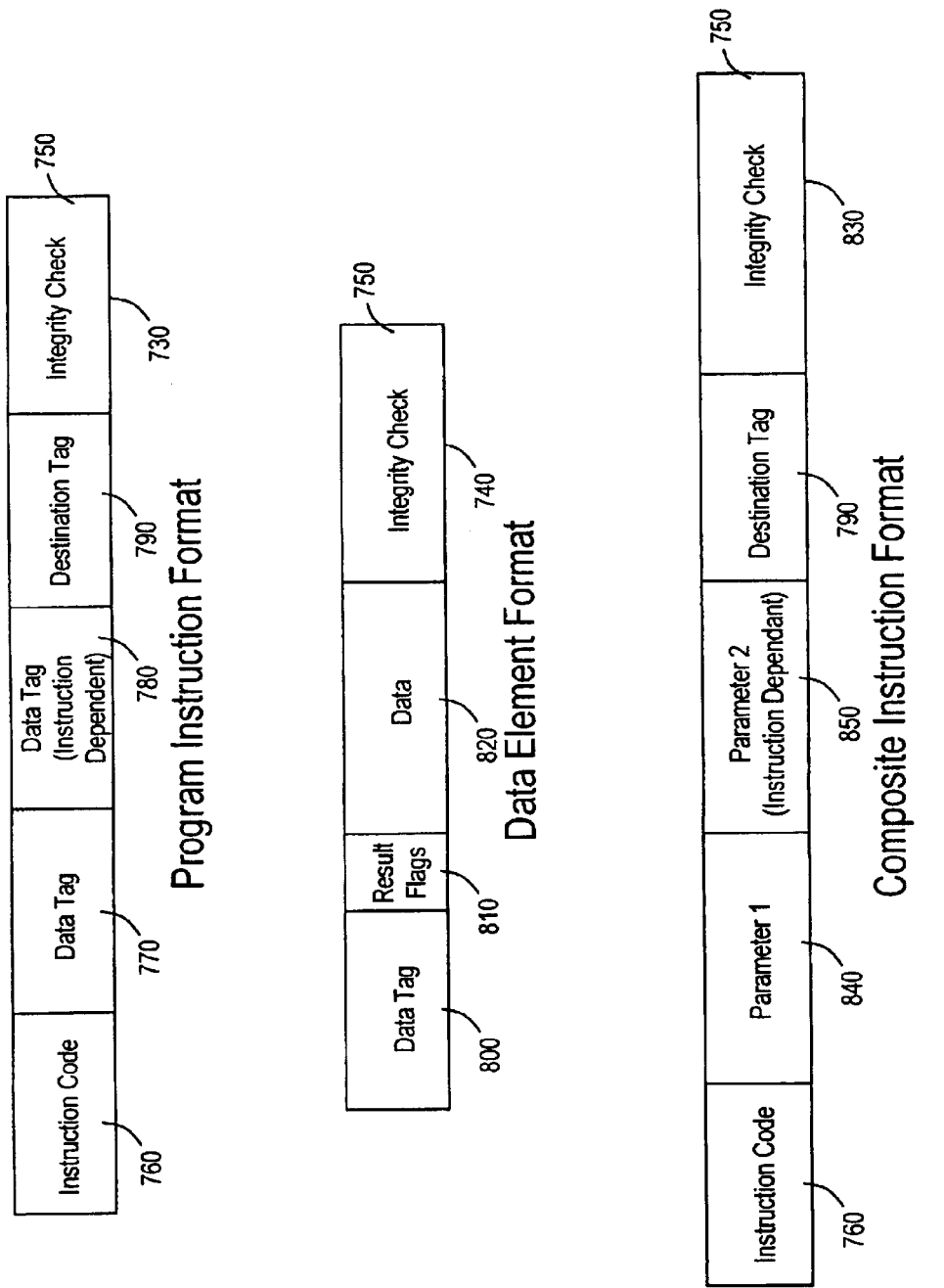

FIG. 6B Instruction and Data Formats and Fault Detection

The first problem to be solved in order to achieve fault tolerance is to reliably detect faults. This can be done using redundancy. For example, faults can be detected by comparing the results of duplicated hardware. A methodology, based on redundancy, which can give a very high probability of fault detection, will typically increase the hardware requirement in terms of the gate counts by a factor of between two and three. This is usually not practical in the case of a processor and memory.

This problem is solved by the use of small trusted hardware modules and integrity checks on instructions and data. This is illustrated by in FIG. 6B, which shows an outline of a program instruction format 730 and a data element format 740. The basic principle used is that each instruction/data format has an integrity check 750 appended to it, which strongly binds the information together. Whenever any data within a format is changed, or when one format is created from another, then the integrity check field is verified before the change and a new integrity check is applied after the change. Therefore, if performing the integrity check, executing the change and applying the new integrity check, is performed in trusted hardware, then any fault occurring between these trusted operations can be detected by the trusted integrity check before any operation is carried out.

The program instruction format includes an instruction code 760, data tags 770, 780, and a destination tag 790. The data element format has a data tag 800, result flags 810, and data 820.

In operation therefore, when an instruction enters the PMIC, its integrity can be checked. The data tags in the instruction can then be used to retrieve the data to be operated upon and the integrity of the data checked. The composite instruction 830 can then be formed and an integrity check generated and appended to it. The composite instruction includes the instruction code 760, parameters 840, 850 and the destination tag 790. The composite instruction is then passed to a processing element 880, where its integrity is checked and the result calculated. The destination tag is then added to the result and an integrity check is appended before the data is written to the execution memory. Any error occurring while the data is in memory or during the passage of data around the system can therefore be detected using the integrity check.

Data I/O

In order to process data, it is necessary to load it into the processor. Generally, data also needs to be output. In doing this however, incoming data must be tagged and bound with an integrity check, while outgoing data must be stripped of this internal format. Meanwhile, it is imperative that data is taken from the correct input and sent to the correct output. This is achieved by using the processing elements and a pair of trusted multiplexors/selectors, one 860, for input and one 870 for output coupled to input buffers 865 and output buffers 875 respectively. In this way, all inputs can be written by any processing element and any processing element can write out to any output.

In order to input data, an instruction is sent to the processing element which identifies the input from which a data element should be loaded and the data tag which is to be added and bound to it. The processing element then selects the relevant input via the trusted selector, and reads the data. The processing element can then add the tag and integrity check as it would for any other instruction, before writing the data to Execution Memory. Output of data is the converse of this, in that a program instruction identifies the data element to be output. The PMIC then fetches this data and combines it with the program instruction to form a composite instruction containing the data to be output and the identity of the output to which it is to be written. The processing element accepting the instruction can then use the output identity to select the correct output, and after stripping away the internal format, send the data to the relevant output buffer.

Incoming data does not have an integrity check field and therefore bypasses the integrity check of the processing element. Outgoing data does not have an integrity check and therefore bypasses the output stage of the processing element which would normally add such an integrity check. It is important to note however, that in order to prevent data passing directly from an input to an output, it is not possible for any data to pass through a processing element without an integrity check being done, an integrity check being added, or both.

This approach has the advantage that the same trusted hardware used during normal processing can be used for both input and output to append and check the integrity fields. Also, it allows more than one processing element to operate on inputs and outputs. This can be used to increase I/O speed, but also allows the input and output of data even though all but one of the processing elements may have failed. While failures at individual inputs can not be prevented, this goes to minimise the circuitry dedicated to a single input, and consequently minimises the chance of a single catastrophic failure. Further work is required to see if it is possible to employ parallel inputs and outputs, and so provide increased fault tolerance.

Non Volatile Data Storage

The architecture essentially has three areas of memory, that is program memory, execution memory and non volatile memory 900. The program memory is itself split into start-up/bootstrap memory and loadable program memory.

The execution memory is used as a "scratchpad" area for processing instructions and is not permanent. A non-volatile storage area is provided for loadable parameter tables and configuration data that may need to be changed, or stored for long periods, but which cannot be stored as constants in the program code. Data in this area can only be written to and from the execution memory. It must therefore be loaded or output in two stages via the execution memory.

All data held within the non-volatile storage area is therefore identified by its data tag that is bound to it by an integrity check field. Any error occurring while in storage is therefore detectable, and as with the execution memory, the use of CAM for the non-volatile memory allows any physical location to be used to store any item of data.

Start-up Bootstrapping and Program Loading

There are two program data areas, (1) a fixed start-up code area, and (2) a loadable program memory area.

On start-up, the boot up code will perform a self test and then either execute the stored program, or bootstrap load the program to be executed. Program code can be loaded from any interface via the execution CAM. The program "file" will be loaded as a data stream, and will be stored in the execution memory in the same format as any other data. It will then be transferred to the program store, where the data will be extracted from the data element format and stored as instructions.

The Program Instruction Format shown in FIG. 6B is therefore produced by the compiler/assembler complete with integrity check.

The program file will also include an overall integrity check/signature, which will be checked by the bootstrap program when it is loaded. This will then be stored with the program to allow a full check of the code to be undertaken at start-up.

FIG. 6A Trusted Inter-Processor Communications

Any processor has a limited data capacity and performance. It is therefore likely that in many applications, tasks may need to be divided and shared between a number of processors. To allow this, a trusted inter-processor communications mechanism is necessary. This mechanism must ensure that data is sent to the correct processor, and that the receiving processor can verify its origin, and that the integrity of the data is preserved en-route. An expansion bus 910, with an expansion in buffer 920 and an expansion out buffer 930 are provided, coupled to the execution memory and the processing elements respectively.

Data within each processor is identified by its data tag. Part of this data tag is the identity of a memory area. This is used when transferring data between locations within one processor to allow an instruction to identify an input, output, execution memory, data store etc. This field can also indicate the identity of a connected processor by setting an internal/external flag within the field. When transferring data to another processor therefore, this field in the instruction is used to address the other device when the data is output through the expansion out buffer. On output however, this field is switched from the identity of the receiving device to the identity of the sending device. Therefore when the data tag received via the expansion input of the receiving device and stored in execution memory, the data tag used to address that data contains the identity of the sending device. This identity is bound to the data with an integrity check, and hence ensures that the received data is identifiable as coming from a particular processor, and that its integrity is protected.

Because the addition of the originating processor identity impacts upon the integrity check, this must be done by trusted hardware.

Figure 6C:
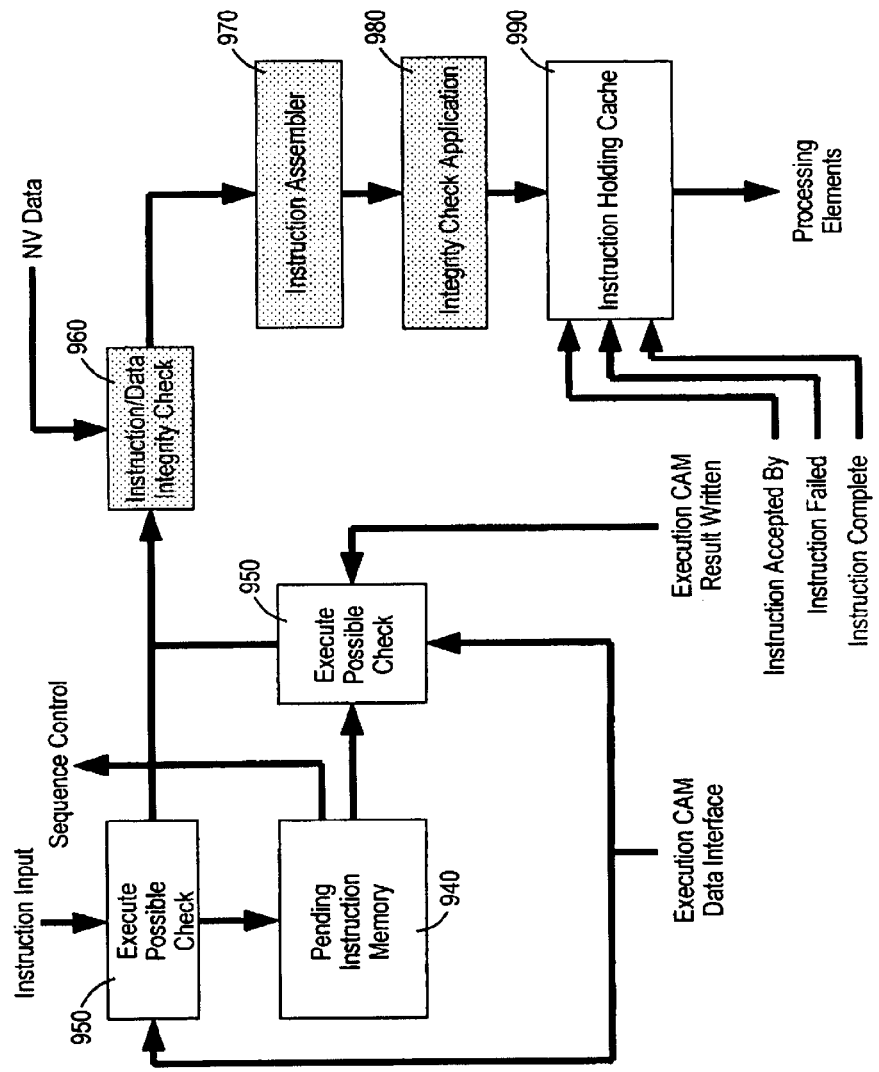

FIG. 6C Pattern Matching and Instruction Combiner

The pattern matcher and instruction combiner 700, of FIG. 6A, has to match the parameters in the instructions received from the sequence controller with the data tags of data in the execution memory. It then uses these data and instruction to generate a composite instruction that can be processed. An example of how the internal architecture may be implemented is shown in FIG. 6C.

FIG. 6C Instruction Evaluation

Instructions to be evaluated are passed as "routines" from the sequence controller to the PMIC. These routines are self-contained batches of instructions which use a specific set of data tags that can be cleared from execution memory when the routine is completed. A single routine may therefore be executed many times. Instructions are stored in a pending instruction store 940, which passes control signals back to the sequence controller. These signals allow the sequence controller to know when the pending instruction store is full or empty. The sequence controller can therefore send as many or as few instructions as it likes to the PMIC at one time.

When an instruction enters the PMIC, its parameters are checked at unit 950 to see if they are available from memory, or from an input. If they are available, then it can be executed immediately. If an instruction's parameters are not available, any parameters that are available are marked as such and the instruction is placed in the pending instruction store. As other instructions are processed and data is written into the execution CAM, then data becomes available allowing execution of instructions from the pending instruction store. As data is written to the execution CAM, this information is passed to the execution checker in the PMIC which can then update the parameter available information, or send an instruction for execution from the pending instruction store.

In this way, the processor provides Greedy execution (meaning instructions are evaluated as soon as data is available, rather than waiting until the result in needed) for any instructions passed to the PMIC. The number and sequence of instructions is controlled by the sequence controller. It would therefore be possible to pass only one instruction at once, so providing purely sequential operation.

This design not only allows Greedy evaluation to maximise the use of the parallel processing elements, but also allows instruction level multi-tasking. This is achieved by passing several small routines to the PMIC at the same time. These routines will not execute sequentially, but instructions will execute as data is either written to execution memory, or data becomes available at an interface. Again, this maximises the use of the parallel processing elements that will be allocated automatically as described in the next sub-section.

If several different processes are to be executed at the same time, there will clearly be contention for use of the processing elements. It is therefore necessary to introduce some sort of prioritisation in order that time critical instructions are processed before less critical instructions. To achieve this, a priority field is included in the instruction code, which can be used in the selection of instructions for execution.

It is important to note that branches are not controlled by the PMIC, but by the sequence controller. While conditional tests will be carried out by the instructions prepared by the PMIC, the results are passed back to the sequence controller which then identifies which routine to execute.

FIG. 6C Instruction Checking and Combination

When an instruction is ready for execution, it is passed, together with any parameters from the execution CAM to the Instruction/Data Integrity Checker 960 which verifies the integrity of both the instruction and its parameters. These can then be assembled into a composite instruction by the instruction assembler 970 and then have a new integrity check added at unit 980 before being passed via the instruction holding cache 990 for execution in a processing element.

In some cases, data will be required from the configuration data store. Generally, this will only be when this data is written to execution memory, using a "move" instruction, as direct execution of data held in the parameter store is prohibited. The existence of this data will not be checked prior to execution, as it should have been loaded earlier by the software application. If it does not exist, then the instruction will not be executed and an error will be flagged to the sequence controller.

Figure 6D:
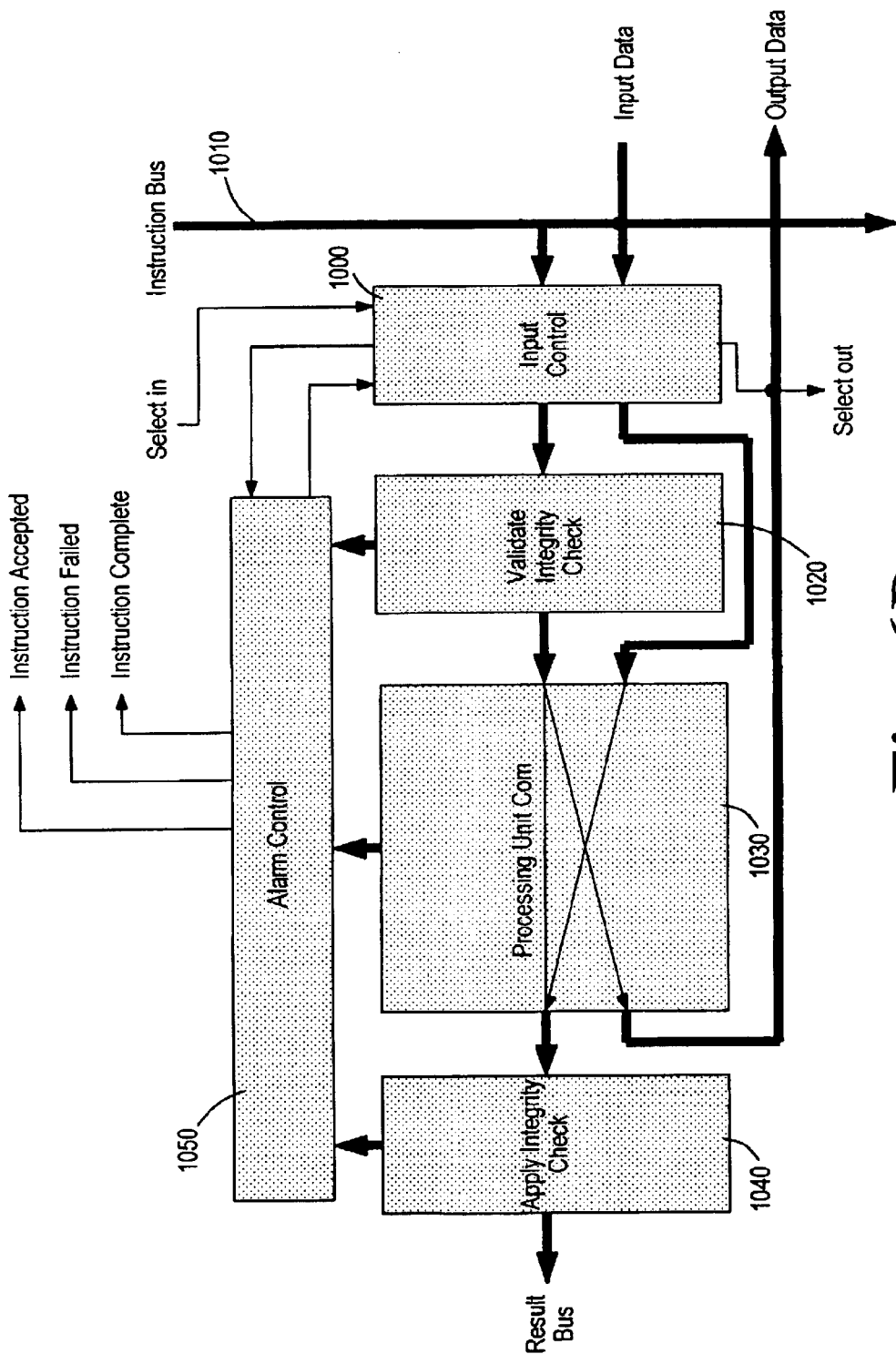

FIG. 6D Processing Elements

The processing elements 880 shown in FIG. 6A essentially provide the equivalent of a Arithmetic Logic Unit (ALU) of the processor. They take the composite instructions, perform an arithmetic operation and output the result to execution memory. The processing elements also include an integrity checker to check incoming data and an integrity field generator which can apply an integrity check to outgoing data. An example of how the internal architecture of the processing element may be implemented is shown in FIG. 6D.

A number of these processing elements operating in parallel. Instructions are passed onto the instruction bus 1010 and accepted by the first freely available processing element. The input control block 1000 of each processing element monitors the "Select In" input. If this "Select In" is set at active, then an indication that the preceding processing element is busy processing an instruction is given. The processing element will therefore accept the next instruction to appear on the instruction bus. On accepting an instruction, the input control block of the processing element sets its "Select Out" active to indicate to the next processing element that it is busy.

On accepting an instruction, the integrity of that instruction is checked by block 1020 and it is passed to the processing unit core. The processing unit core 1030 then performs the arithmetic operation on the data in accordance with the instruction code and applies the destination data tag before passing the destination tag and result to the integrity check application block 1040. It is this block which adds the integrity check field, before the data is passed out to the result bus. In the case of instructions which result in an underflow, or overflow, (e.g. addition, logical shift etc.) one of the result flags will be set for use in subsequent operations.

The processing elements also provide a means of inputting and outputting data. For data being input, the processing element will use the information in the instruction to select the correct input and will then read the data from that input. In the case of input data, the integrity check is bypassed, as the raw incoming data will not have an integrity check field. The raw input data is passed to the processing unit core, where the destination tag from the instruction is added before the data has an integrity check added before being passed out onto the result bus.

Data to be output using a similar process. The composite instruction containing the data and the identity of the output is passed to a processing element. On input, its integrity is checked. The output is then selected and the data from the instruction is passed directly to the selected output. In this case, no integrity check is generated as data must be output in its raw form.

An alarm control block 1050 is provided as part of the effort to report any errors and thereby allow the affected instructions to be re-executed.

Figure 6E:
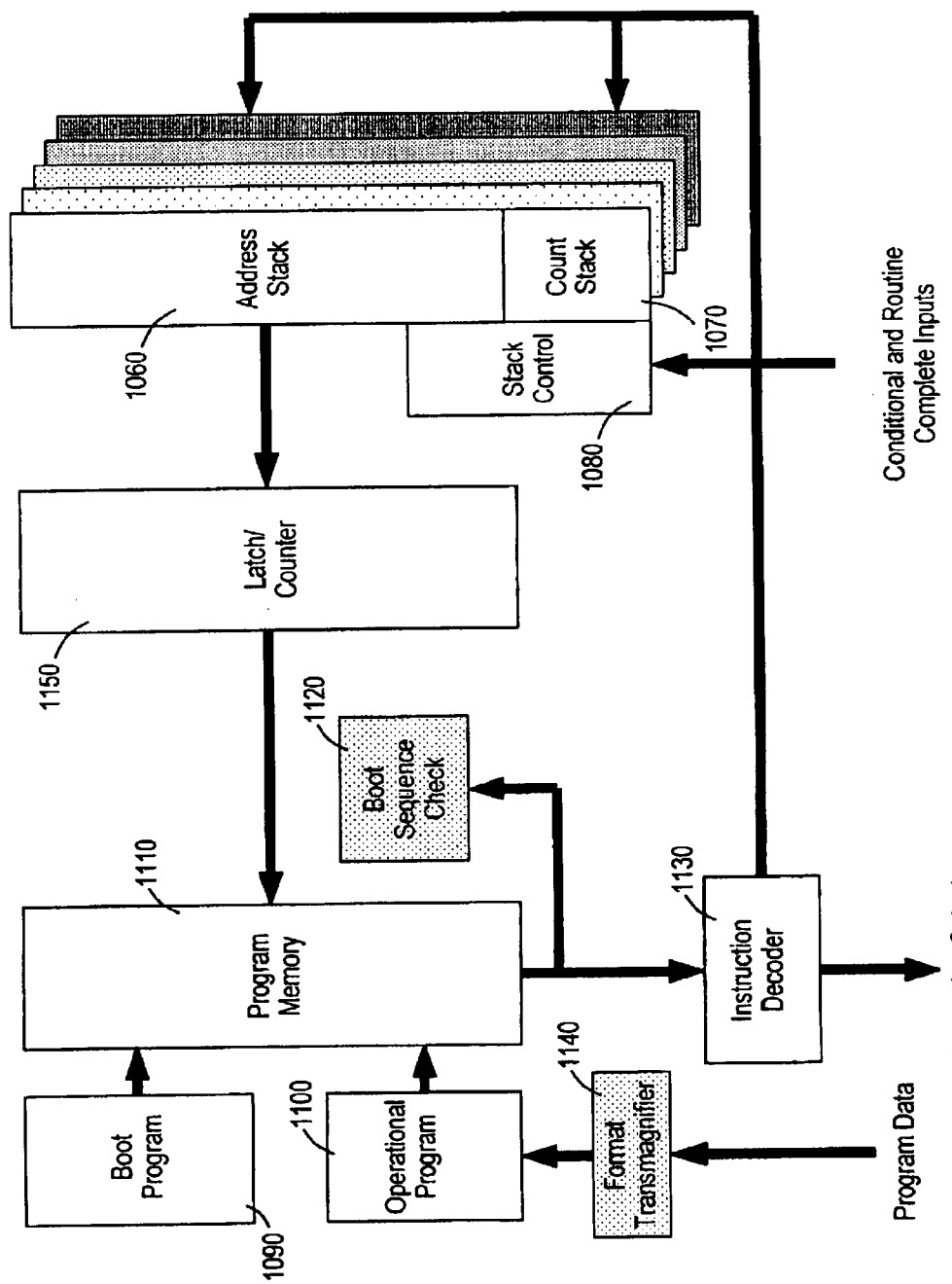

FIG. 6E Program Sequence Controller and Program Memory

As described earlier, the architecture of FIG. 6A is a sequential processing machine. It processes the instructions given to it and while it can perform conditional tests, it does not contain any flow control. The Sequence control which encompasses the program memory 890 and the program counter and sequence and interrupt control 720, of FIG. 6A, therefore needs to act on the result of conditional test and provide all branching and flow control. The sequence controller also contains the program memory for both the application program and bootstrap code. An example of how the internal architecture of the sequence controller may be implemented is shown in FIG. 6E.

The Stack—Subroutines and Nested Loops

The heart of the sequence controller is the stack which includes an address stack 1060, a count stack 1070 and stack control 1080. The address stack looks like a "last in last out" (LILO) buffer. Addresses are "pushed" onto the stack using a program instruction, and they may be "popped" out of the stack into the latch/counter 1150 to enable branching. In order to provide a simple mechanism for multiple loops, a count is associated with each address. This count is set as part of the instruction that pushes the address into the stack and is decremented each time a "pop" for that instruction is received. The address and count are only discarded from the top of the stack when the count has reached zero. This allows a multiple sub-routine call to be set up.

A multiple sub-routine call is set up by pushing a return address with a count of zero onto the stack, followed by the subroutine address with a count equal to the number of times the subroutine is to be executed minus one. When the stack is next "popped" the sequence will branch to the subroutine. At the end of the subroutine, the stack will be popped again. In the event that the count associated with the subroutine start has not reached zero, then the same address will be popped again. This process continues until the count associated with the start address finally reaches zero. At that point, it is discarded. The next time the stack is popped, the return address will be on the top of the stack. These two instructions therefore represent the higher level concept— "Do Routine A n times and then go-to B",—where A and B identifies the routine start and the return address respectively, and n is the number of times the routine is to be executed. This can then be taken further, giving multiple nested loops, limited only by the depth of the stack and the size of the count.

As described earlier, routines are loaded into the PMIC by the sequence controller. In the case of a simple sequential program with no branches, the next routine could be loaded into the PMIC when the PMIC pending instruction store is empty. However, branching is necessary for most programs, and several routines can be loaded into the PMIC at the same time, which can run concurrently. To manage this, signals indicating "routine complete" will be returned from the PMIC to the sequence controller. A similar process will handle conditional branch result signals. These will be used to control popping of the stack, and hence program sequencing.

It is not possible to properly handle this concurrency with a single stack. Thus, conceptually, a separate stack is required for each thread that is running. At the beginning of a routine, two addresses will be pushed onto the stack to be used by that routine. The first address is one to "jump to" upon successful completion of that subroutine, and the second address is one to "jump to" in the event of a failure. A "routine complete" instruction written into the PMIC will be executed when the routine is complete. This will identify the successful completion of that particular routine, and given that there were no errors during execution, pop the "success" address, and discard the "failed" address. In the event of a failure, the converse will occur, allowing a recovery routine to be started, or the same routine to be run again.

Conditional branching will be handled using a third address. Following the "routine completed" jump, a POP instruction will be issued. If the selected condition input is active, then the address on the top of the stack will be popped, otherwise it will be discarded and the counter/latch will increment to select the next instruction.

The use of a count tagged address stack which consists of X stacks, each stack being Y deep, will allow X different threads each to have Y nested sub-routines. However the use of such a rigid structure does not allow for any fault tolerance. Neither is it efficient in the use of resources. For example only X threads are possible, even if no nesting is required. In the event of only one thread being required, only Y nested routines are possible.

Another approach is therefore to treat the stack memory (which consists of X*Y locations) as an amorphous set of memory elements, in which each address & count pair is labelled together with a thread identity (representing one of the stacks) and a position value representing the order in which that address was pushed onto the stack. When an address is written, the thread number is added, along with the position number (which is a value one greater than the highest position value of any address belonging to that thread currently on the stack). Conversely, when an address is popped, then the address is selected by thread number and the highest position number of any address for that thread number.

Reading and writing values uses a form of content addressing. This allows the available memory to be shared in many way between the threads. Thus, a memory consisting of X*Y elements could allow a single thread to have routines nested (X*Y) deep, whilst, at another time allowing up to X*Y threads. Further, because the memory elements are not rigidly structured (i.e. not "location addressed".), then in the event that one should fail, that memory element could be "switched out" without undue detriment to the operation of the device. In order to detect such a failure, an integrity check would need to be written to each piece of data written to the stack, and checked when a read out is performed.

Program Memory, Bootstrapping and Application Loading

The program memory is conceptually split into three areas,
a. the bootstrap program in ROM, 1090
b. the application or operational program 1100 loaded by the bootstrap program, and
c. a program memory area 1110 from which the code is actually run.

On a cold start, the start-up/bootstrap program will be loaded into the program memory area and executed. Instructions are passed from memory to the instruction decoder under control of the latch/counter. Branch control instructions are passed to the stack element of the process controller, while other instructions are passed to the PMIC for execution.

The first thing the start-up program does is to perform a self check on the sequence controller architecture. This will take the form of a sequence of stack pushes and pops which ensure that all physical nodes within the sequence controller can be set to a logic zero and a logic one (i.e. ensuring that every bit can be toggled). This will lead to branching throughout the memory area. Assuming that the memory is location addressed, then the bootstrap program would occupy the full memory area. During this checking sequence, the Boot Sequence Check block 1120 will be calculating a CRC on the boot program instructions being executed. On completion of the sequence, a "verify boot sequence" instruction will be issued containing the expected value of the CRC to be checked by the boot sequence checker. Only on successful completion of this check will the path from the Instruction Decoder 1130 to the PMIC be opened and the application program memory enabled.

Upon completion of the check, the bootstrap program will check for the presence of the application program, and if it exists then it will be loaded. If there is no application program loaded, then a boot strap routine will be called to load the application via one of the inputs.

The application program will be loaded from an input via the processing elements and CAM as data elements. As a part of this loading, an authentication check will be performed upon the application to verify its source. If authentication is successful, then the data will then be passed into application memory via the format transmogrifier 1140. This effectively takes the data element format of FIG. 6B, strips off the destination tag, performs an integrity check, and then assembles the data. In this fashion, those instructions originally input, are recreated complete with their own valid integrity check.

Figure 6F:
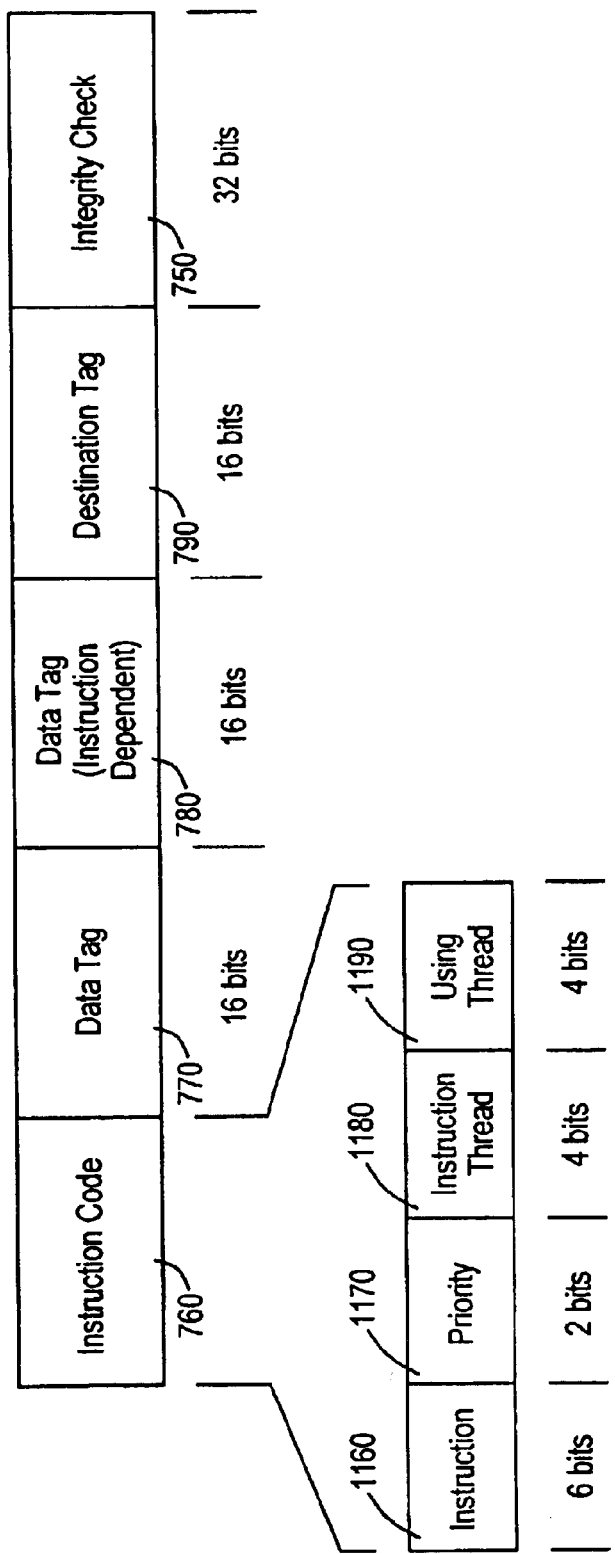
Figure 6G:
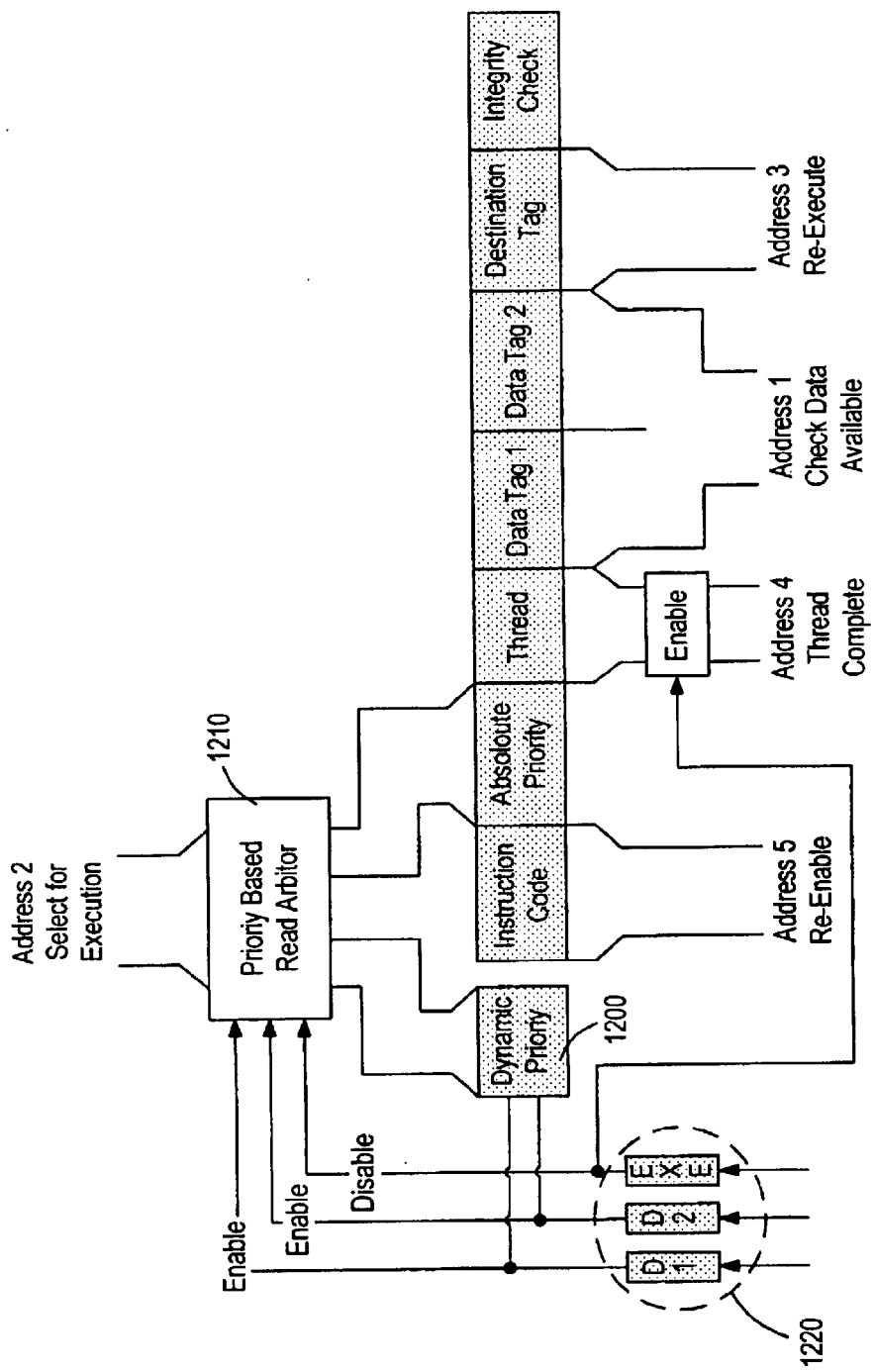

FIGS. 6F, 6G Pending Instruction Store Implementation

The pending instruction store 940, shown in FIG. 6C, must provide instructions as required for the composite instruction formatters and manage all aspects of the execution of those instructions. To do this, it must be able to provide instructions for re-execution, keep track of which instructions have data available to allow their execution, manage instruction priorities and determine when a routine for a particular thread has completed. This must be done at the speed at which instructions can be executed by the execution units.

The speed at which instructions must be delivered is dependant on the time taken for one instruction to be formatted, passed to a processing unit, processed and written back into CAM. For the purposes of calculating this requirement, it is assumed that there are eight instruction formatters and eight processing units, and that the instruction format is based on sixteen bit words, with a 32 bit integrity check as shown in FIG. 6F. Reference numerals corresponding to those in FIG. 6B have been used. The instruction code 760 includes portions for instruction, 1160, priority 1170, instruction 1180 and using thread 1190. It can then be further assumed that the instruction is formatted and processed in 16 bit parallel operations using a flow through state machine with parallel integrity checking in the composite instruction formatter. That is to say, that data is not processed and then passed on, but that the result may start to emerge as the final data is being entered and that the composite instruction formatter checks the integrity of the instruction and the two parameters in parallel. It is also assumed that data and instructions are loaded fully parallel into composite instruction formatter. This therefore assumes minimal delays around the loop as follows:

a. Load composite instruction formatter—3 Clocks (one instruction plus one for each parameter).
b. Delay through Composite Instruction Formatter—8 clock cycles (6 to clock the data through plus two for integrity check generation).
c. Additional delay through processing unit—4 clock cycles (two for processing and two for integrity check generation.

Allowing a further two clock cycles for writing to CAM and one for transfer from the instruction formatter to the processing unit, this gives 18 clock cycles. With eight instruction formatters and eight processing units, an instruction would therefore be required every 2.25 clock cycles.

To achieve this, it is clearly not possible to search through the pending instructions and therefore another approach using multi-port content addressing is proposed. This is illustrated in FIG. 6G

FIG. 6G shows a single entry in the pending instruction store (Instruction Code through Integrity Check) with content addressing being used on different fields within the instruction for different purposes. The instruction format follows that shown in FIGS. 6B and 6F. A dynamic priority field 1200 and a parity based read arbiter 1210 have been added to each location, together with three flags 1220. Flags D1 and D1 indicate whether the instructions parameters are available and EXE flag indicates whether the instruction has been executed. Operation is described in the following paragraphs.

As data is written to execution CAM, Address 1 is used to see if that data is required by any instruction in the pending instruction store. Matching of a data tag within an instruction would result in the corresponding flag, D1 or D2, being set. It should be noted that these flags may also be set as the instruction is written to the pending instruction store if the data is already available.

Address 2 is used to read instructions for execution. The priority based read arbiter is enabled by flags D1 and D2 and disabled by flags EXE. Instructions whose data is available and which have not been executed are then selected on the basis of their absolute priority assigned and their dynamic priority. The dynamic priority has been added to allow the priority of low priority instructions to be increased as they are passed over in favour of instructions with a higher absolute priority. If such a technique were not used, then some routines may never execute. Dynamic priority is simply a count of the number of times that instruction has been passed over for execution when it could have been executed. This is then used by the priority based read arbiter to give a composite priority. Should two or more instructions have the same composite priority, then an arbitrary selection of the instruction to be executed that cycle will be made.

Address 3 is used when an instruction needs to be re-executed. If a parameter is read and its integrity check fails, then the data tag in the instruction that was used to retrieve the data (not the data tag attached to the data which may be corrupt) is used to address the destination tags in the pending instruction store to select the instruction that created the data. Address 5 must then be used to re-enable the instruction who's data was corrupt, by re-setting the EXE flag.

Address 4 is used to identify when all instructions in the pending instruction store associated with a particular thread have been executed. This must be checked as each instruction is executed and if no instructions remain to be executed, all instructions related to that thread may be cleared from the pending instruction store on successful completion of that last instruction. Completion of the routine can then be signalled back to the sequence controller.

FIGS. 6A–6G Fault Detection, Tolerance, and Recovery

In developing the processor architecture, one objective has been to detect all faults to a high degree of probability and prohibit spurious output. Having achieved this, the next objective is to be able to recover from hardware failures in as many areas as possible, with the minimum impact on execution of the program. The architecture described is capable of detecting any failure with a probability determined by the strength of the integrity check used. Several mechanisms have also been described that allow continued operation in the presence of hardware failures. There are always going to be a small number of failures from which recovery will not be possible. This next section identifies mechanisms that could be considered for the provision of some fault tolerance and recovery for the architecture described.

Figure 6H:
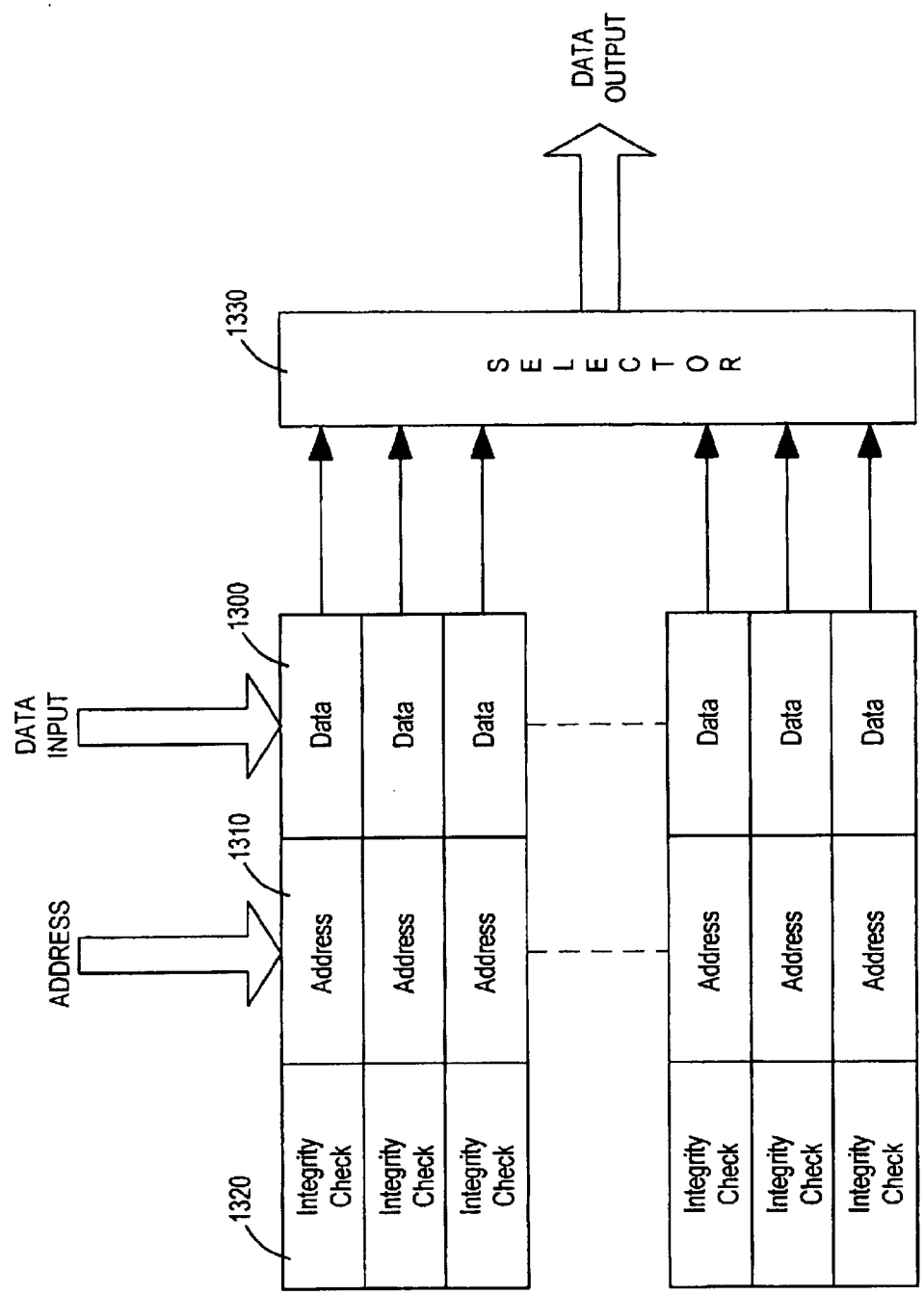

FIG. 6H Memory Arrangement

CAM can be used to provide fault tolerant memory for the data store, exemplified by the execution memory, and for other memories such as the application memory and the operational memory, by switching out failed storage elements. As shown in FIG. 6H, the storage elements correspond to rows, each row containing a data element 1300 an address field 1310 and an integrity check field 1320. The contents of the memory are retrieved via a selector 1330, using content addressing on the address field. When data is written, an integrity check is calculated on the data and address and written with the data and the address. When data is read, this integrity check can be verified and if a failure has occurred, then that memory element can be switched out. Because data does not have to be stored in any particular location, the memory can continue to operate even if rows of memory have been switched out.

The memory could also be tested at power on, to ensure that faulty memory was not used. In addition, it would be possible to use an error correcting code for the integrity check, which could be used to correct faulty data before it were output.

Errors in Storage: Execution Memory Errors

Any errors occurring in the execution memory will be immediately detected when data is read, by using the integrity check field associated with the data. Such errors may be soft errors due to electromagnetic interference or radiation, or could be induced soft hardware faults. Importantly, upon the detection of a fault, a second check must be performed in order to ascertain if the fault is hard or soft. If the failure is determined as being hard, then the memory element must be disabled so that it can no longer be used. Because the execution memory is a CAM, this will not impact any running application, so long as there is more memory available than is actually needed by the program. Data is identified by its tag, and not by its location. Thus, if there are disabled memory elements, then data can simply be written to other physical areas of the memory.

If one of the methods of execution error recovery (as described below) is used, then the check to determine if the error is hard or soft may not be necessary. The alternative is to have the capability of disabling a memory element as the occurrence of any error, but re-enable it on start-up. A test routine run at start-up could then scan the memory elements and disable all those elements that give errors. This approach will, however, have an impact on the size of the bootstrap program.

Errors in Storage: Program Memory Errors

The program memory is divided into three distinct areas, viz. boot, application and operational memory. All memory is checked during operation using the integrity check mechanism. The boot memory will be mask programmed and therefore not susceptible to soft errors. Only catastrophic hardware failures (e.g. an entire bus failure) can introduce an error. There is no point, therefore, in considering this matter further.

Both the application memory and operational memory could be either location addressed memory, or content addressable memory. In the case of location addressed memory, there are extremely few possibilities for recovery from a hardware fault, though fault detection remains provided. If content addressable memory were used, then a similar approach could be used as described for the execution memory. In that approach, failed cells can be "turned off". In the case of the operational program memory, the system would need to be re-started to recover from a failure. For the application memory, error recovery could only be by a. reloading the application from an external PROM, or
b. by having two copies of program and using one to repair the other. If this were done, then continuous checking of the "standby" program would be required, so that if it sustained errors, then it could be repaired from the operational program.

Errors in storage: Parameter Memory Errors

The Parameter Memory is intended to store long term, but changeable, parameters used by the application. This memory is again implemented using CAM and data is stored in the standard data format together with a data tag and an integrity check. Again fault tolerance can be provided by "switching out" failed elements. In order to allow full recovery and continued correct operation, two copies of the data would need to be kept, and synchronised.

Execution Errors

This subsection covers all errors, both hard and soft, that could occur during the execution of an instruction from the pending instruction store. This therefore covers the PMIC, the Processing Elements and the Execution CAM.

The PMIC and Processing Elements have been described previously as trusted elements, which will themselves detect erroneous operation. To achieve this, they will be designed using a proven methodology that uses redundancy to provide self-checking to a given high degree of confidence. Also, there are several processing elements, which both provide parallelism and redundancy. The processor could still operate (with some reduction to throughput) using a single processing element. In practice, to obtain the performance benefits of multiple processing elements, the instruction checking and combination section of the PMIC will also need to be replicated. These functions will be relatively slow, because of the essential need to perform and generate integrity checks. However, they will be trusted to detect erroneous operation and can be "switched out" in the event of failure.

Given the potential for large scale redundancy in the execution CAM, it can be seen that the majority of the circuitry involved in execution can reliably detect failures and can be automatically "switched out" should it fail. The remaining circuitry is associated with the pending instruction store. This is not replicated, but failures will be detected by the integrity check of the instructions it outputs. Mechanisms are therefore required for recovery from:

a. Errors which result in data circuitry being "switched out", and hence instruction cycles being lost;
b. errors in the instructions supplied by the pending instruction store.

For a. above, hardware can be switched out on failure. This may be a task of the instruction combiner, a processing element, or an execution CAM memory element. The problem resulting from such a failure would be the loss of the data that would have resulted from the instruction. The immediate solution is to run the instruction again. For a failure in the combiner, or the processing element, it would be possible to ensure that instructions remained in the pending instruction store until they had been successfully executed. Should there be a failure during execution, they could then be run again. For the processing elements, it would be possible to cache the composite instructions as shown in FIG. 6C and re-run from there. The bigger problem comes from a failure in the execution CAM, which may occur after the data has been written.

Failures in the execution CAM will only be detected when data is read from memory in the form of parameters for the next instruction. In order to recover from such an error, it would be necessary to re-run the instruction again. In a conventional architecture, all the interim results leading to the generation of a piece of data, and it being subsequently being written to memory would be lost. The processor maintains all interim results generated within a routine being processed. Therefore, if the set of instructions relating to each routine are retained within the pending instruction store until the routine has successfully completed (i.e. upon execution they are marked as completed rather than being discarded) then if the instruction that created the erroneous data could be identified, then the instruction could be re-run and the erroneous data re-created.

Holding instructions in the pending instruction store until a routine has been completed is straightforward, requiring only a simple "successfully executed" marker to be set on execution and cleared on an error. The solution to identifying which instruction created the data is also far simpler than may at first be apparent. Each instruction carries a destination tag to identify the data that is the result on the instruction, and those data tags within concurrently executing routines must be unique. Therefore, the data tag of a piece of data can be used to completely and positively identify the instruction that created it.

This approach of re-execution is therefore perfectly viable, and demands little overhead. The same approach can be used for all execution errors. The one final requirement is to determine when the end of a routine occurs, so that the instructions can be discarded, and moreover, to ensure that any data passed on to subsequent routines is correct. This is necessary, because the data created by the final instructions in a routine will not be used by that routine, but will be by the next. If the instructions were cleared, then it would not be possible to recreate any of that final result data. The solution to this problem, is to add a "verify" instruction, which does not cause any processing, but does cause data that is to be passed to the next routine to be read. This will force a check upon the data and a re-calculation if necessary. The completion of all verify instructions associated with a particular routine can also be used to signal its completion.

For errors occurring in the pending instruction store, it is actual instructions that will be lost and therefore a different approach to that described above is needed. Also, as there is no redundancy in this area, only soft errors can be catered for. This situation could be improved upon by using CAM as the basis for the pending instruction store, but the recovery mechanism would be the same as above, i.e. the entire routine must be re-run.

Should an error occur in this area, it will be necessary to re-run the routine. This will involve clearing down all instructions associated with the routine in the pending instruction store, together with the clearing of all areas of execution CAM to which the routine has written, and finally signalling to the sequence controller that re-submission of the instructions is required. All routines are self-contained. While they may take input and create output in the execution CAM, there is no reason, in general, why they can not be re-run (subject to real time processing constraints). One exception is in the case of routines taking data from an input. There is no point in re-running such a routine, as the data will no longer be available to be fetched. It is therefore suggested that input routines should be self-contained, only reading data to the execution CAM (and no more). If there is an error, re-running the routine will attempt to fetch the next block of data (assuming that they should be available). Application specific buffering outside the device could then be used, if necessary, in order to provide a recovery mechanism.

Program Sequencing Errors

Error checks in the Sequencer are carried out at start-up, with error checking performed on instructions as they are executed. There is potential for checking addresses read from the stack. Given an error in a branch address, however, there is little recovery action that can be taken beyond restarting the system from cold, i.e. by running the start-up program from PROM. This would allow recovery from both soft and hard errors in the CAM stack. However, with no further replication of functions, other hardware errors would likely be fatal.

Options for the Integrity Check Field

The basis of most of the error detection described here is based on the use of an integrity check. This is described as being used purely for error detection. In applications where error detection is paramount, such an approach must be taken and the integrity check should be chosen to provide maximum probability of error detection. In such cases the use of a Cyclic Redundancy Check such as that defined for CCITT CRC16. A CRC will give a probability of approximately 1 in $2^n-1$ of the detection an error. A 16 bit CRC check therefore, would fail to detect an error approximately once in every 65535 cases.

Using a CRC does provide for a high degree of error detection, allowing recovery to be attempted, or the system shut safely down. In some applications, however, it may be essential that soft errors can be successfully corrected even with a lower probability of error detection. In such applications, the integrity check could take the form of an error correcting code. While the use of such codes would introduce additional data to be processed, and hence in a greater overhead in terms of data throughput than that for a CRC, simple error correcting codes can guarantee to detect and correct single bit errors. Typically the size of the integrity check generated from such a code would be 75% of the size of the data it was protecting, which is the main consideration mitigating against their use.

Error recovery is possible without necessarily introducing error-correcting codes, except in the case for the program instructions. Unless these are replicated, a faulty instruction cannot be corrected. For certain applications therefore there may be merit in using error-correcting codes to maintain operation even with errors in the program instruction code.

Error Indication

The occurrence of any faults should be signalled so that the device can be replaced before further faults degrade operation beyond acceptable limits, or stop operation altogether. The processor will therefore provide trusted indication of fatal and non-fatal errors.

Figure 7:
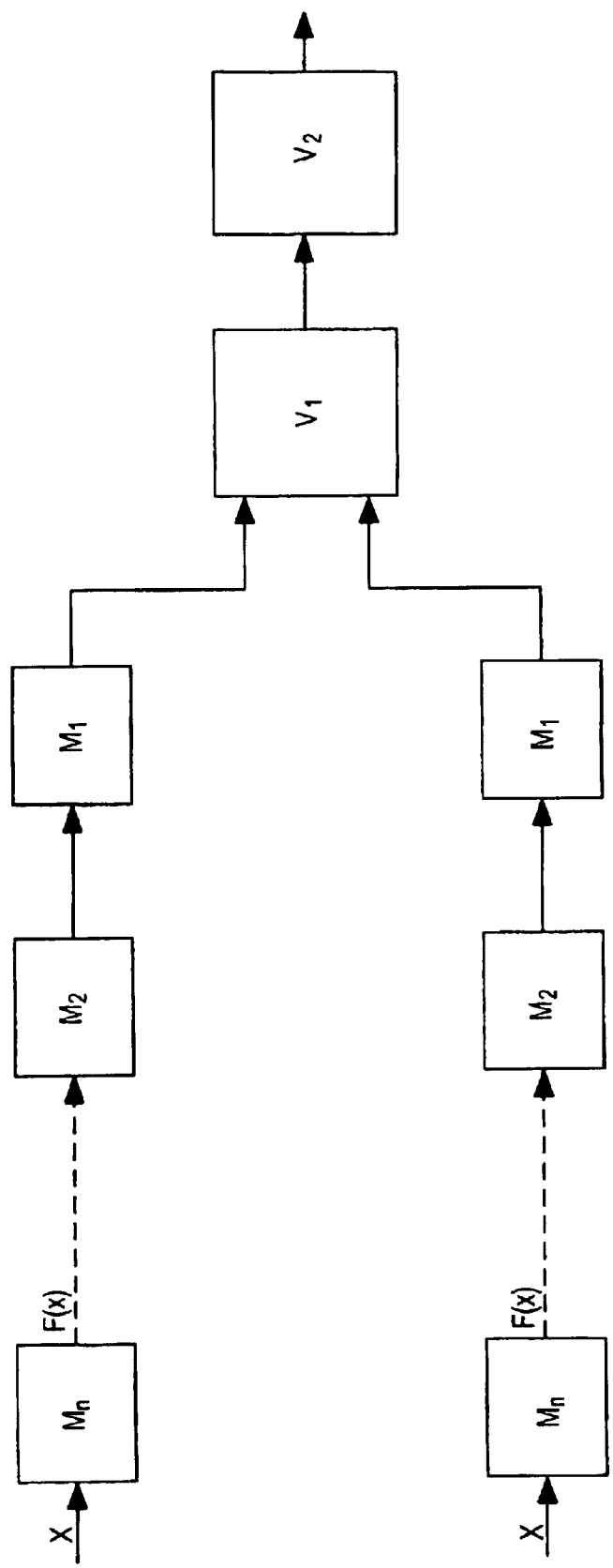
FIG. 7 shows an assured checking block mechanism according to an embodiment of the invention having checking circuitry on several redundant system outputs which are fed to a selector.

FIG. 7; Embodiment Using Parallel Redundancy

FIG. 7 shows a pair of identical processing elements MN for carrying out a function such as F(X) in each case, the output F(X) is checked by a pair of state machines coupled in series. The first state machine $M_2$ checks the result, and the second state machine $M_1$ checks the result of the first state machine. The outputs and any alarms are sent to comparator/selector V1 and V2. The selector can rely on the checking circuitry so that it knows which of its two inputs are faulty, if they are not the same. The selector may need to be implemented in trusted circuitry, using a cascade of state machines V1,V2 as shown. The selector can be implemented more simply than a selector which needs to carry out majority voting, and so is also simpler to check.

An advantage of this arrangement is that the need for an odd number of parallel redundant systems can be avoided. It used to be common to provide three redundant systems in parallel, so that a majority decision could be taken by the selector, if one system was producing an output different to the other two.

Like the arrangement shown in FIG. 5, the parallel redundant system with series checking, of FIG. 7, could be employed as an implementation of the trusted processing elements of FIG. 3, or could used independently of the arrangement of FIG. 3.

Figure 8:
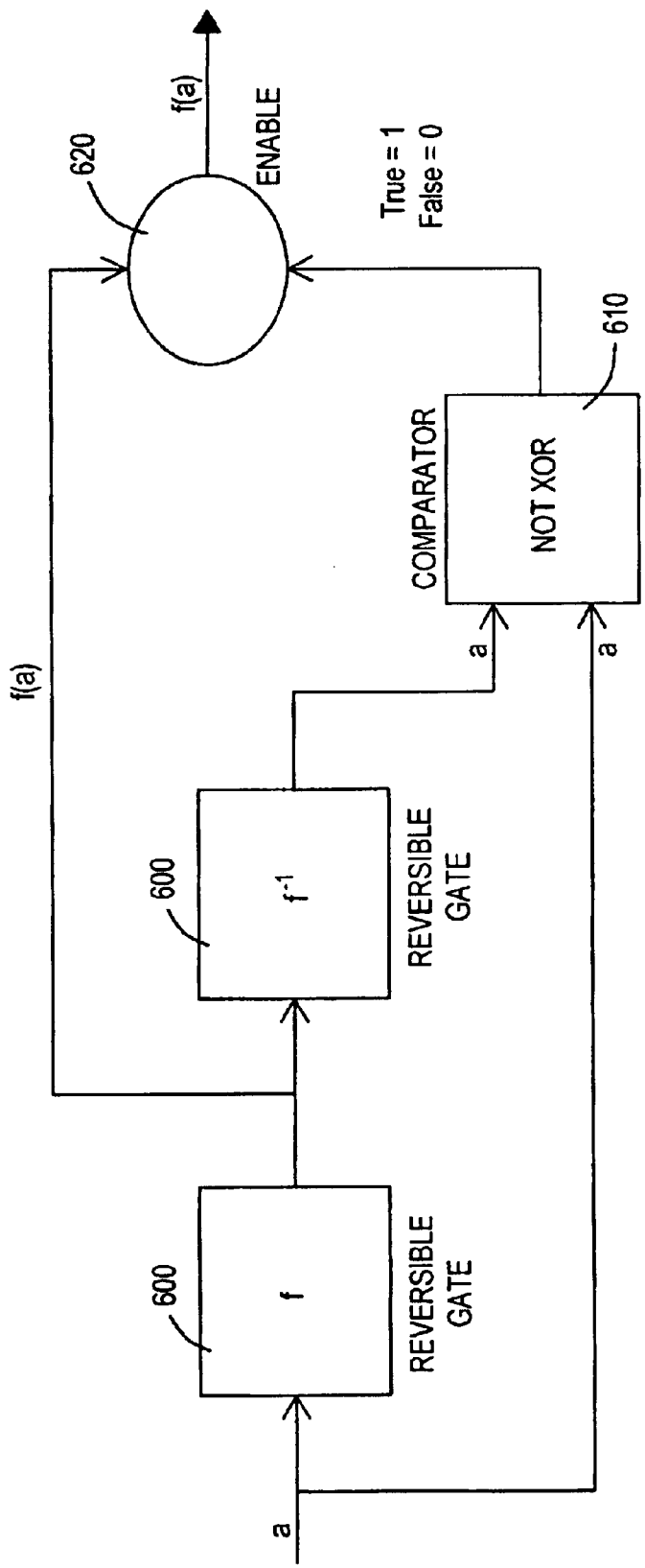
FIG. 8 shows an example of circuitry for checking the operation of a logic function f according to an embodiment of the invention.

FIG. 8; Circuitry for Checking the Operation of a Logic Function

This figure shows a schematic of a checking arrangement using a reversible gate. This arrangement or combinations of this arrangement can be used to form the state machines described above.

A reversible gate means that the boolean expression contained within the gate is its own inverse so that the original inputs can be readily derived from the outputs. This enables the operation of the gate to be checked as shown in FIG. 8. An input A is fed to the reversible gate 600. It outputs the function F(A). The same gate 600 is used to reverse the function to recover A. A comparator 610 is used to compare the input to the first reversible gate and the output of the second reversible gate. This comparator can be in the form of a boolean NOT XOR operation. A positive output means the inputs were both A and therefore the reversible gate can be deduced to have functioned correctly in both the outputting F(A) and in reversing this function. Accordingly, the output of the comparator can be used to enable the output F(A) to be sent out by output buffer 620.

When this arrangement is used to implement the above-mentioned state machines, the output F(A) can be the data output, and the output of the comparator can be the alarm output. This means the alarm indicates if the internal operation is incorrect. There may be no check on whether the inputs are correct or in a correct sequence.

One key advantage of using a reversible gate is that the same circuitry can be used for checking as is used for performing the function. Accordingly, the burden of proving the operation of these circuits can be significantly reduced, either in terms of time or cost or both.

Furthermore, if arrangements of reversible gates with checking are used in combination to perform more complex computational functions, then those combinations will also be assured, to the extent that if the inputs are correct, then the outputs will also be correct. For further assurance, identical functions can be cascaded to any required length to enable a given building block to check the output of the previous block in the cascade.

In practice, if necessary, a delay line may be included between the input A and the comparator 610 to match any delay in the signals passing through the series coupled reversible gates 600.

Figures 9A, 9B:
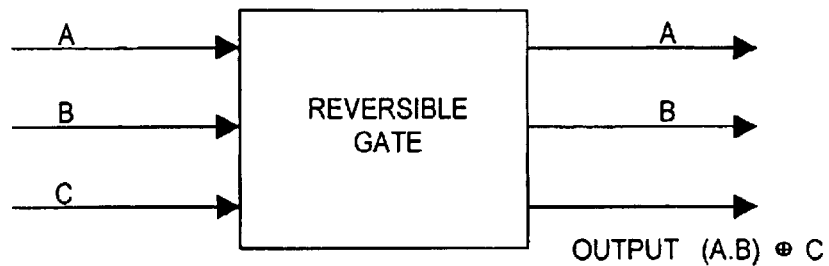
FIG. 9A shows a reversible gate according to an embodiment of the invention.
FIG. 9B shows the truth table for the reversible gate of FIG. 9A.
Figure 10:
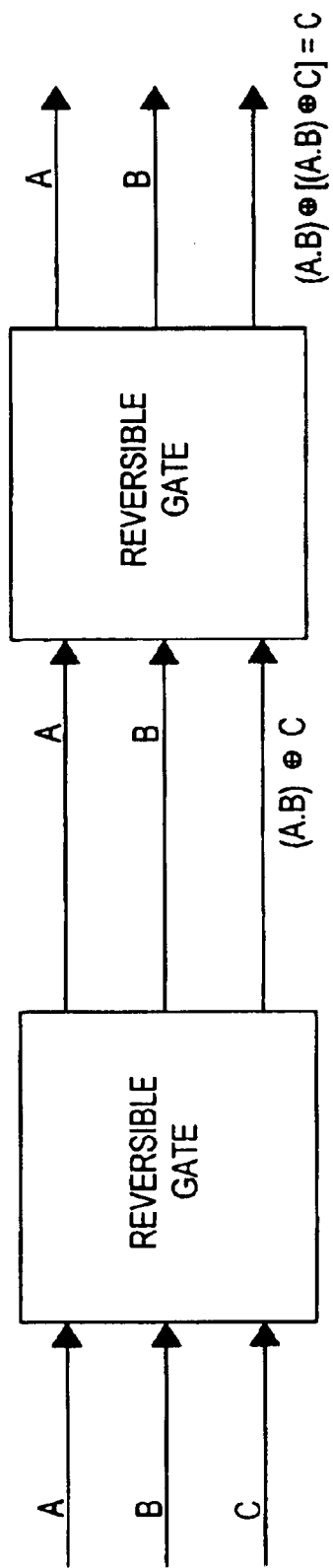
FIG. 10 shows how a pair of the reversible gates of FIG. 9A can be coupled together to achieve the reversibility.

FIGS. 9A, 9B, and 10: An Example of a Practical Reversible Gate

FIG. 9 shows a reversible gate suitable for use in the arrangement of FIG. 8. It has three inputs A, B and C. It has three outputs A, B (which match two of the inputs), and a third output (A AND B) XOR C. This is just one of many reversible functions which could be used. This one is convenient because it gives a range of standard logic functions without involving great complexity. As can be seen, if the outputs are passed a second time through the same logic block, the result is the same as the original inputs, because A and B are the same, and C=(A AND B) XOR [(A AND B) XOR C]=C.

FIG. 9B shows the truth table for this reversible gate. FIG. 10 shows the reversibility if two of these reversible gates are placed in series, connected straightforwardly as shown, the outputs of the second reversible gate will be the same as the inputs to the first reversible gate.

This particular reversible function can be used for the following logical functions 1. AND (if C is tied alone) 2. XOR (if A or B is tied high) 3. NOT (if A and B are tied high) 4. COPY (if B and C are tied high). This means that with minimum wastage, any logical computational function can be generated by combining these reversible gates and tying appropriate inputs. Even the comparison function 610 of NOT XOR can be achieved.

A notable advantage arises from the capability of constructing more complex higher order logic functions by combining basic logic blocks. Each basic logic block can use the identical proven circuitry with the checking capability described above. Each logic block can be configured by tying one or more of the inputs to give the desired logic function. If desired, further checking circuitry can be added to check the operation of the original checking circuitry, depending on the degree of assurance desired. If it is desired to check the connections between the checked circuits, then test sequences to toggle and check all the bits could be used.

Thus it can be guaranteed that the output of the higher order functions will be correct, if the inputs are correct. Other steps can be taken to ensure the inputs are correct such as the CRC and data type checks described above. The chain of guaranteed or assured operation can thus cover the hardware implementation of high order logic, and extend to an entire processor such as the dataflow processor described above, or other processors. The hardware design may be formally proven for conformance with a higher level specified requirement, which may be set out in mathematical form following well established principles which need not be described in more detail. This enables the implementation in lower level logic gates to be proven mathematically.

The use of the dataflow processor and a provable programming language such as one which gives a purely declarative program as discussed above, run on the assured hardware, enables the chain of guaranteed or assured operation to be extended up to the software also. The software design may also be formally proven for conformance, by expressing the requirements in a mathematical form, to enable the implementation in the programming language to be proven mathematically. Again this expression in mathematical form and proof for conformance can follow well established principles which need not be described in more detail.

It would also be possible to construct even more basic building blocks using simpler reversible Boolean functions.

In principle the simplest useful reversible Boolean function is a two input, two output gate, one output being the inverse of one input, the other output being the same as the other input. These simpler functions could be used with a comparator to build a simple checked circuit as above, then combined to create more complex functions.

Another possible implementation of the state machine would be to have parallel redundancy of the function f(a) rather than the serial redundancy shown in FIG. 8. The comparator remains the same and simply compares the outputs of the two or more redundant functions. This enables a non reversible function to be used, and enables a simplification in that the inputs need not be carried through to the next stage.

However such an arrangement is not fully redundant as the information at the inputs and the actions of the function on those inputs are not fully represented at the output for comparison. A consequence is that it cannot be proven to such a high degree of rigour that faults in the operation will always be detected. If the function f(a) is a one to one function, i.e. any set of inputs has only one set of outputs, then an equivalent level of fault detection could be achieved by the parallel arrangement. Nevertheless the use of a reversible function as shown in FIG. 8 is still advantageous from the view of mathematically proving that all errors have been captured. Often the proof is considerably more difficult than implementing the function. It is necessary to prove that the function is one to one for a parallel redundant arrangement, whereas for a reversible circuit, this is implicit because the inputs are compared at the comparator, and there is no need to analyse the implementation to prove that it is one to one, i.e. fully redundant.

Also a reversible function gives the minimum amount of information to be compared at the comparator because the number of outputs could in a one way but non reversible function, be greater than the number of inputs.

Concluding Remarks

Other variations and alternatives will be apparent to a skilled person and are not intended to be excluded from the claims. Above has been described a dataflow processor comprising a combiner for combining instructions and data, processing elements for carrying out the instructions, has error checking at the inputs to the processing elements and the combiner, and has self-checking circuitry for these parts. The amount of circuitry which needs to be trusted, (i.e. of proven design, and verified operation) can be advantageously limited. This enables the processor to be constructed more simply and to operate faster.

The processing elements may have a series of state machines, each checking the output of the previous. Self checking circuitry may be constructed using combinations of basic configurable verified circuit. This circuit has a reversible Boolean function, and other circuitry to check its output. The other circuitry has a second reversible Boolean function for regenerating the original inputs, and a comparator for verifying if the regenerated values match the original values.

What is claimed is:

1. A processor for executing instructions, comprising;
   a data store,
   an instruction store,
   a combiner for combining instructions and data associated with a respective one of the instructions,
   processing elements for carrying out the instructions and outputting results,
   wherein the processing elements and the combiner comprise trusted circuitry, the trusted circuitry comprising circuitry whose design has been proven to operate correctly, and comprising self checking circuitry for checking that it has not operated incorrectly,
   the processor further comprising circuitry for checking for errors in data and instructions input to the processing elements and to the combiner.

2. The processor of claim 1, further comprising circuitry for detecting an error in data output by the processor.

3. The processor of claim 1, the circuitry for checking the data comprising circuitry for adding error detection information to the data before the data is passed to untrusted circuitry, and circuitry for using the error detecting information to detect errors in the data after it has passed through the untrusted circuitry.

4. The processor of claim 3, the circuitry for detecting an error and adding the error detection information comprising trusted circuitry.

5. The processor of claim 3, comprising circuitry for recognising the type of data from a label attached to the given piece of data, and wherein the error detection information relates to a bound data packet comprising the label and the associated data.

6. The processor of claim 1, being arranged to process data of different types, and comprising circuitry for detecting which type a given piece of data is and checking that the type is a valid type for whatever operation is to be carried out on the data.

7. The processor of claim 6, comprising circuitry for recognising the type of data from a label attached to the given piece of data.

8. The processor of claim 1 wherein the self-checking circuitry comprises a series of state machines, comprising least a first and a second state machine, the first state machine being arranged to receive one or more data inputs to be checked, and provided with data outputs for reflecting the one or more data inputs, and an alarm output for indicating that the data inputs are incorrect, the second state machine being coupled to the data outputs and the alarm output of the first state machine, and being arranged to verify that the data output and the alarm output of the first state machine are correct.

9. The processor of claim 8, wherein the first state machine comprises a processing function and is arranged to output one or more processed data outputs, and all the subsequent state machines in the series are arranged to receive the processed data outputs from a respective preceding one of the state machines, check if any are incorrect and output them to a respective succeeding one of the state machines.

10. The processor of claim 8, the series of state machines being arranged such that a data output of the last in the series of state machines is fed back into any of the state machines.

11. The processor of claim 1, the self checking circuitry comprising two or more state machines coupled in series, and circuitry for carrying out a sequence which causes toggling of each output of each state machine to verify the operation of each output of the state machines.

12. A method of using the processor of claim 1 for executing the instructions.

13. A method of running a program written in declarative language using the processor of claim 1.

14. A method of producing signals using the circuit arrangement of claim 1.

15. The processor of claim 1, the data store having an arrangement to turn off a portion of the data store found to be faulty during operation.

16. The processor of claim 1, further having one or more external interfaces, and a selector for selectively coupling the external interfaces to the processing elements.

17. The processor of claim 1, further comprising an inter-processor interface arranged to check the origin and integrity of data received from this interface.

18. A circuit arrangement comprising a series of state machines, the series comprising least a first and a second state machine;

the first state machine being arranged to have a data output, and an alarm output for indicating incorrect operation, the second state machine being coupled to the data output and the alarm output of the first state machine, and being arranged to verify that the data output and the alarm output of the first state machine are not indicating incorrect operation; and a last state machine in the series being arranged to output an alarm indicating incorrect operation, and output a data output, the data output being fed back as an input into one of the series of state machines.

19. A circuit arrangement comprising:

two or more redundant processing systems, each outputting processed data, and a selector for selecting one of the processed data outputs, the arrangement further comprising circuitry for checing the correct operation of the respective processing system, the circuitry for checking and the circuitry for selecting between the processed outputs comprising trusted circuitry, the trusted circuitry comprising circuitry whose design has been proved to be correct, and comprising self-checking circuitry for detecting incorrect logic operations, the self-checking circuitry comprising a series of state machines, the series comprising least a first and a second state machine, the first state machine being arranged to receive one or more data inputs to be checked, and provided with data outputs for reflecting the one or more data inputs, and an alarm output for indicating that the data inputs are incorrect, the second state machine being coupled to the data outputs and the alarm output of the first state machine, and being arranged to verify that the data output and the alarm output of the first state machine are correct.

20. The circuit arrangement of claim 19, wherein the first state machine comprises a processing function and is arranged to output one or more processed data outputs, and all the subsequent state machines in the series are arranged to receive the processed data outputs from a respective preceding one of the state machines, check if any are incorrect and output them to a respective succeeding one of the state machines.

* * * * *